US009708427B2

(12) United States Patent
Ker et al.

(10) Patent No.: US 9,708,427 B2
(45) Date of Patent: Jul. 18, 2017

(54) PROCESS FOR POLYMERIZATION IN A FLUIDIZED BED REACTOR

(71) Applicant: NOVA Chemicals (International) S.A., Fribourg (CH)

(72) Inventors: Victoria Ker, Calgary (CA); Sergio Alejandro Guillen-Castellanos, Calgary (CA); Yan Jiang, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 15/163,187

(22) Filed: May 24, 2016

(65) Prior Publication Data
US 2016/0347878 A1    Dec. 1, 2016

(30) Foreign Application Priority Data

May 26, 2015  (CA) .................................... 2892552

(51) Int. Cl.
C08F 2/34     (2006.01)
C08F 4/6592   (2006.01)
C08L 23/08    (2006.01)
C08F 210/16   (2006.01)
C08F 2/00     (2006.01)
C08F 4/659    (2006.01)

(52) U.S. Cl.
CPC ............ *C08F 210/16* (2013.01); *C08F 2/001* (2013.01); *C08F 2/34* (2013.01); *C08F 4/65912* (2013.01); *C08F 4/65916* (2013.01); *C08F 2410/02* (2013.01); *C08F 2420/04* (2013.01); *C08L 23/08* (2013.01)

(58) Field of Classification Search
CPC .......... C08F 2/34; C08F 2/001; C08F 4/6592; C08L 23/08
See application file for complete search history.

(56) References Cited

U.S. PATENT DOCUMENTS

| | | |
|---|---|---|
| 4,543,399 A | 9/1985 | Jenkins, III et al. |
| 4,588,790 A | 5/1986 | Jenkins, III et al. |
| 4,701,432 A | 10/1987 | Welborn, Jr. |
| 4,808,561 A | 2/1989 | Welborn, Jr. |
| 4,935,397 A | 6/1990 | Chang |
| 4,937,301 A | 6/1990 | Chang |
| 5,026,795 A | 6/1991 | Hogan |
| 5,028,670 A | 7/1991 | Chinh et al. |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,283,278 A | 2/1994 | Daire et al. |
| 5,317,036 A | 5/1994 | Brady, III et al. |
| 5,324,800 A | 6/1994 | Welborn, Jr. et al. |
| 5,342,749 A | 8/1994 | Sakanoue et al. |
| 5,352,749 A | 10/1994 | DeChellis et al. |
| 5,405,922 A | 4/1995 | DeChellis et al. |
| 5,436,304 A | 7/1995 | Griffin et al. |
| 5,453,471 A | 9/1995 | Bernier et al. |
| 5,462,999 A | 10/1995 | Griffin et al. |
| 5,616,661 A | 4/1997 | Eisinger et al. |
| 5,633,394 A | 5/1997 | Welborn, Jr. et al. |
| 5,668,228 A | 9/1997 | Chinh et al. |
| 5,703,187 A | 12/1997 | Timmers |
| 5,965,677 A | 10/1999 | Stephan et al. |
| 6,002,033 A | 12/1999 | Razavi et al. |
| 6,022,935 A | 2/2000 | Fischer et al. |
| 6,034,021 A | 3/2000 | Wilson et al. |
| 6,063,879 A | 5/2000 | Stephan et al. |
| 6,103,657 A | 8/2000 | Murray |
| 6,114,479 A | 9/2000 | Speca et al. |
| 6,124,230 A | 9/2000 | Speca et al. |
| 6,140,432 A | 10/2000 | Agapiou et al. |
| 6,235,672 B1 | 5/2001 | McKay et al. |
| 6,271,325 B1 | 8/2001 | McConville et al. |
| 6,274,684 B1 | 8/2001 | Loveday et al. |
| 6,277,931 B1 | 8/2001 | Jaber et al. |
| 6,300,438 B1 | 10/2001 | McConville |
| 6,300,439 B1 | 10/2001 | McConville |
| 6,303,719 B1 | 10/2001 | Murray et al. |
| 6,309,997 B1 | 10/2001 | Fujita et al. |
| 6,320,002 B1 | 11/2001 | Murray et al. |
| 6,342,463 B1 | 1/2002 | Stephan et al. |
| 6,372,864 B1 | 4/2002 | Brown |
| 6,399,535 B1 | 6/2002 | Shih et al. |
| 6,399,724 B1 | 6/2002 | Matsui et al. |
| 6,417,304 B1 | 7/2002 | McConville et al. |

(Continued)

FOREIGN PATENT DOCUMENTS

CA    2 716 772 A1    4/2011
EP    0 107 127 A1    5/1984

(Continued)

OTHER PUBLICATIONS

Peri, J.B. and Hensley, A.L. Jr.; The Surface Structure of Silica Gel; The Journal of Physical Chemistry; vol. 72, No. 8, Aug. 1968; pp. 2926-2933.
Brunauer, Stephen, Emmett, P.H. and Teller, Edward; Adsorption of Gases in Multimolecular Layers; Journal of the American Chemical Society, Feb. 1938, 60(2), pp. 309-319.
Clark, James H. and Macquarrie, Duncan J.; Supported Catalysts; Kirk-Othmer Encyclopedia of Chemical Technology, Copyright 2001 by John Wiley & Sons; Published online; Nov. 15, 2002; pp. 1-37.

(Continued)

*Primary Examiner* — Caixia Lu

(74) *Attorney, Agent, or Firm* — Julie L. Heinrich

(57) ABSTRACT

A polymerization process for stable gas phase reactor start-up when making ethylene copolymers having relatively high molecular weight distribution and melt flow ratio.

25 Claims, No Drawings

(56) References Cited

U.S. PATENT DOCUMENTS

| | | |
|---|---|---|
| 6,489,413 B1 | 12/2002 | Floyd et al. |
| 6,559,090 B1 | 5/2003 | Shih et al. |
| 6,562,924 B2 | 5/2003 | Benazouzz et al. |
| 6,583,083 B2 | 6/2003 | Murray et al. |
| 6,593,266 B1 | 7/2003 | Matsui et al. |
| 6,686,306 B2 | 2/2004 | Shih |
| 6,689,847 B2 | 2/2004 | Mawson et al. |
| 6,734,131 B2 | 5/2004 | Shih et al. |
| 6,770,723 B2 | 8/2004 | Fujita et al. |
| 6,777,509 B2 | 8/2004 | Brown et al. |
| 6,968,375 B1 | 11/2005 | Brown |
| 6,984,695 B2 | 1/2006 | Brown et al. |
| 7,476,715 B2 | 1/2009 | McKay et al. |
| 7,834,107 B2 | 11/2010 | Koppl et al. |
| 8,338,551 B2 | 12/2012 | Jacobsen et al. |
| 2010/0210791 A1* | 8/2010 | Bergstra .............. C08F 210/16 525/240 |
| 2011/0212315 A1 | 9/2011 | Fantinel et al. |
| 2014/0100343 A1 | 4/2014 | Ker et al. |
| 2014/0155561 A1 | 6/2014 | Ker et al. |

FOREIGN PATENT DOCUMENTS

| | | |
|---|---|---|
| EP | 0 811 638 A2 | 12/1997 |
| EP | 1 308 464 A1 | 5/2003 |

OTHER PUBLICATIONS

Pangborn, Amy B., Giardello, Michael A., Grubbs, Robert H., Rosen, Robert K. and Timmers, Francis J.; Safe and Convenient Procedure for Solvent Purification; Organometallics, 1996, 15 (5); copyright 1996 by the American Chemical Society; Publication date (Web): Mar. 5, 1996, pp. 1518-1520.

Hieber, C.A. and Chiang, H.H.; Some correlations involving the shear viscosity of polystyrene melts; Rheologica Acta, Jul. 1989, vol. 28, Issue 4, pp. 321-332.

Hieber, C.A. and Chiang, H.H.; Shear-Rate-Dependence Modeling of Polymer Melt Viscosity; Polymer Engineering & Science, vol. 32, Issue 14, Jul. 1992, pp. 931-938.

Bird, R. Byron, Armstrong, Robert C., Hassager, Ole; Dynamics of Polymeric Liquids, vol. 1: Fluid Mechanics, 2nd Edition; Chapter 4: The Generalized Newtonian Fluid; May 1987, pp. 169-175.

ASTM D 6474-99; Standard Test Method for Determining Molecular Weight Distribution and Molecular Weight Averages of Polyolefins by High Temperature Gel Permeation Chromatography; Copyright by ASTM International 1999; Downloaded May 21, 2013; pp. 1-6.

ASTM D5227-01 (Reapproved 2008); Standard Test Method for Measurement of Hexane Extractable Content of Polyolefins; Copyright by ASTM International 2001; Downloaded Aug. 13, 2012; pp. 1-4.

ASTM D6645-01; Standard Test Method for Methyl (Comonomer) Content in Polyethylene by Infrared Spectrophotometry; Copyright by ASTM International 2001; Downloaded Feb. 2, 2012; pp. 1-4.

ASTM D1238-10; Standard Test Method for Melt Flow Rates of Thermoplastics by Extrusion Plastometer; Copyright by ASTM International 2010; Downloaded Nov. 17, 2011; pp. 1-15.

ASTM D792-13; Standard Test Methods for Density and Specific Gravity (Relative Density) of Plastics by Displacement; Copyright by ASTM International 2013; Downloaded Feb. 24, 2014; pp. 1-6.

\* cited by examiner

PROCESS FOR POLYMERIZATION IN A FLUIDIZED BED REACTOR

Some single site catalysts make ethylene copolymers having relatively high molecular weight distributions (e.g. from about 3 to about 7) and melt flow ratios (e.g., greater than about 25) in the gas phase. The present disclosure provides an improved process by which to start-up a gas phase reactor which involves starting at high temperature and hydrogen concentration, followed by making targeted product at lower temperature and hydrogen concentration.

Processes which polymerize ethylene optionally with one or more alpha-olefin comonomer in the gas phase are well established. In some embodiments, a gas-phase polymerization is carried out in a fluidized bed reactor system. In a fluidized bed polymerization process, a bed of polymer particles within a reactor is maintained in a fluidized state by the passage of a rising gaseous stream containing polymerizable olefins. The start-up of a polymerization reaction in a fluidized bed by the addition of a polymerization catalyst can be challenging especially if an ethylene copolymer having a broad molecular weight distribution, a higher melt flow ratio (i.e., $I_{21}/I_2$), a lower density and or a higher melt index is to be made. These factors can depress the polymer sticking temperature and/or the melting point, which in turn can lead to reactor fouling. The addition of condensing agents, which are used to help remove heat from the reactor, can exacerbate the issue by increasing the tendency of the polymer to stick to the reactor walls. These problems can escalate quickly at commercial scale, impacting reactor continuity and stability. For these reasons, it is necessary to balance many process parameters to ensure smooth polymerization reaction take off on catalyst addition and subsequent reactor operation.

Some single site catalysts useful for the gas phase polymerization of ethylene with comonomers have very high levels of hydrogen sensitivity. That is, relatively small increases in hydrogen lead to relatively large decreases in the polymer molecular weight (as hydrogen is a chain transfer agent). For this reason, it is preferable for some types of catalyst to use little hydrogen during the polymerization start-up. However, the absence of significant amounts of hydrogen during start-up may lead to problematic levels of static in the reactor and to reactor fouling. For this reason, a start-up procedure may require producing a polymer with a higher initial melt index before transitioning to a lower target melt index.

For example, to target a polyethylene having a melt index, $I_2$ of 1 g/10 min, a gas phase start up procedure may begin with making a polyethylene having a melt index, $I_2$ of around 3 to 4 g/10 min by using higher levels of hydrogen. Once reactor stability is established, a gradual reduction in the level of hydrogen is used until the target 1 g/10 min is reached. However, as hinted at above, this strategy can itself be problematic when the initially increased melt index is combined with the making of an ethylene copolymer having a relatively high melt flow ratio and/or a relatively broad molecular weight distribution. That such ethylene polymers can be made with newer generations of single site catalysts, is shown in for example U.S. Patent Application Publication No. 2014/0100343 A1.

We now disclose an alternative process for polymerizing ethylene with alpha olefins in the gas phase. The process utilizes a start-up and polymerization sequence that helps to reduce fouling when making ethylene copolymers having a relatively broad molecular weight distribution and/or a relatively high melt flow ratio.

In an aspect of the disclosure, a start-up procedure is provided which mitigates problems associated with a polymerization reaction start-up.

In an aspect of the disclosure, an improved transitioning strategy is provided to move from a first ethylene copolymer to a second ethylene copolymer in a gas phase polymerization reactor without reactor operability upsets or reactor fouling.

Provided is a process for polymerization in a gas phase reactor, the process comprising: a) fluidizing a bed of polymer particles in a reactor with a gas mixture comprising ethylene and one or more alpha olefin at a first hydrogen concentration $[H_2]^A$; b) introducing a single site catalyst system to the reactor to initiate a polymerization reaction; c) polymerizing the ethylene and the one or more alpha olefin at a first reactor temperature, $T^A$ to give a first ethylene copolymer with a first melt index, $I_2^A$, a first melt flow ratio, $(I_{21}/I_2)^A$, and a first density, $d^A$, until at least one reactor bed volume has turned over, where a reactor bed volume is defined as the volume of the reactor from a reactor distributor bed plate to the top of the fluidized bed; and d) subsequently reducing the hydrogen concentration and the reaction temperature to a second hydrogen concentration $[H_2]^B$ and a second reactor temperature $T^B$, respectively, to give a second ethylene copolymer with a second melt index, $T^B$, a second melt flow ratio, $(I_{21}/I_2)^B$, and a second density, $d^B$; wherein the first melt index, $I_2^A$ is greater than the second melt index, $I_2^B$.

In an embodiment of the disclosure, the second melt flow ratio, $(I_{21}/I_2)^B$ is greater than the first melt flow ratio, $(I_{21}/I_2)^A$.

In an embodiment of the disclosure, the first and second ethylene copolymers each have a melt flow ratio, $(I_{21}/I_2)$ of from 20 to 50.

In an embodiment of the disclosure, the first melt flow ratio, $(I_{21}/I_2)^A$ is at least 25.

In an embodiment of the disclosure, the second melt flow ratio, $(I_{21}/I_2)^B$ is at least 30.

In an embodiment of the disclosure, the first melt flow ratio, $(I_{21}/I_2)^A$ is less than 33.0.

In an embodiment of the disclosure, the second ethylene copolymer has a second melt flow ratio, $(I_{21}/I_2)^B$ of ≥33.0.

In an embodiment of the disclosure, the first melt index, $I_2^A$ is greater than 1 g/10 min.

In an embodiment of the disclosure, the second melt index, $I_2^B$ is less than 1 g/10 min.

In an embodiment of the disclosure, the first density, $d^A$ is greater than the second density, $d^B$.

In an embodiment of the disclosure, the first and second ethylene copolymers each have a density of from 0.912 to 0.937 g/cm³.

In an embodiment of the disclosure, the second ethylene copolymer has a molecular weight distribution $(M_w/M_n)$ which is greater than the molecular weight distribution $(M_w/M_n)$ of first ethylene copolymer.

In an embodiment of the disclosure, the first and second ethylene copolymers each have a molecular weight distribution $(M_w/M_n)$ of from 3.5 to 6.0.

In an embodiment of the disclosure, the first reactor temperature, $T^A$ and the second reactor temperature, $T^B$ differ by at least 2° C.

In an embodiment of the disclosure, the first hydrogen concentration $[H_2]^A$ and the second hydrogen concentration $[H_2]^B$ differ by at least 15 ppm.

The Single Site Catalyst System

The polymerization catalyst used in the present disclosure will comprise a single site (transition metal) catalyst, but may comprise further components such as but not limited to a support(s), catalyst activator(s), and continuity additive(s) (also known as "catalyst modifier(s)").

Suitable single site catalysts for use in a single site catalyst system are metallocene catalysts, constrained geometry catalysts and phosphinimine catalysts all of which are polymerization active organometallic compounds well known to persons skilled in the relevant art. Some non-limiting examples of metallocene catalysts can be found in U.S. Pat. Nos. 4,808,561; 4,701,432; 4,937,301; 5,324,800; 5,633,394; 4,935,397; 6,002,033 and 6,489,413. Some non-limiting examples of constrained geometry catalysts can be found in U.S. Pat. Nos. 5,057,475; 5,096,867; 5,064,802; 5,132,380; 5,703,187 and 6,034,021. Some non-limiting examples of phosphinimine catalysts can be found in U.S. Pat. Nos. 6,342,463; 6,235,672; 6,372,864; 6,984,695; 6,063,879; 6,777,509 and 6,277. Other single site catalysts for use in a single site catalyst system known in the art may also be used in the process of the present disclosure (e.g., catalysts comprising phenoxyimine and similar closely related ligands such as those described in U.S. Pat. Nos. 6,309,997; 6,399,724; 6,770,723 and 6,593,266; and catalysts comprising bidentate or tridentate ligands having a group 15 atom such as those described in U.S. Pat. Nos. 6,274,684; 6,689,847; 6,583,083; 6,300,438; 6,417,304; 6,300,439; 6,271,325; 6,320,002; 6,303,719; and 6,103,657).

In some embodiments the single site catalyst is based on a group 3, 4 or 5 metal (where the numbers refer to columns in the Periodic Table of the Elements using IUPAC nomenclature). In one embodiment, single site catalysts are based on metals from group 4, which includes titanium, hafnium and zirconium. In another embodiment the single site catalysts are group 4 metal complexes in their highest oxidation state.

In some embodiments, the single site catalysts described herein require activation by one or more co-catalytic or activator species in order to provide polymer. Hence, single site catalysts are sometimes called "pre-catalysts".

Particularly suitable for use in the present disclosure are phosphinimine catalysts which are further described below.

In some embodiments the phosphinimine catalyst is based on metals from group 4, which includes titanium, hafnium and zirconium. In one embodiment the phosphinimine catalysts are group 4 metal complexes in their highest oxidation state.

The phosphinimine catalysts described herein, usually require activation by one or more co-catalytic or activator species in order to provide polymer from olefins.

A phosphinimine catalyst is a compound (for example, an organometallic compound) based on a group 3, 4 or 5 metal and which is characterized as having at least one phosphinimine ligand. Any compounds/complexes having a phosphinimine ligand and which display catalytic activity for ethylene (co)polymerization may be called "phosphinimine catalysts".

In an embodiment of the disclosure, a phosphinimine catalyst is defined by the formula: $(L)_n(PI)_mMX_p$ where M is a transition metal selected from Ti, Hf, Zr; PI is a phosphinimine ligand; L is a cyclopentadienyl-type ligand; X is an activatable ligand; m is 1 or 2; n is 0 or 1; and p is determined by the valency of the metal M. In one embodiment m is 1, n is 1 and p is 2.

In an embodiment of the disclosure, a phosphinimine catalyst is defined by the formula: $(L)(PI)MX_2$ where M is a transition metal selected from Ti, Hf, Zr; PI is a phosphinimine ligand; L is a cyclopentadienyl-type ligand; and X is an activatable ligand.

The phosphinimine ligand is defined by the formula: $R_3P=N-$, where N bonds to the metal, and wherein each R is independently selected from a hydrogen atom; a halogen atom; $C_{1-20}$ hydrocarbyl radicals which are unsubstituted or further substituted by one or more halogen atom and/or $C_{1-20}$ alkyl radical; $C_{1-8}$ alkoxy radical; $C_{6-10}$ aryl or aryloxy radical (the aryl or aryloxy radical optionally being unsubstituted or further substituted by one or more halogen atom and/or $C_{1-20}$ alkyl radical); amido radical; silyl radical of the formula: $-SiR'_3$ wherein each R' is independently selected from hydrogen, a $C_{1-8}$ alkyl or alkoxy radical, $C_{6-10}$ aryl or aryloxy radicals; and germanyl radical of the formula: $-GeR'_3$ wherein R' is as defined above.

In an embodiment of the disclosure, the phosphinimine ligand is chosen so that each R is a hydrocarbyl radical. In a particular embodiment of the disclosure, the phosphinimine ligand is tri-(tertiarybuty)phosphinimine (i.e., where each R is a tertiary butyl group, or "t-Bu" for short).

In an embodiment of the disclosure, the phosphinimine catalyst is a group 4 compound/complex which contains one phosphinimine ligand (as described above) and one ligand L which is a cyclopentadienyl-type ligand.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from a $C_{1-30}$ hydrocarbyl radical (which hydrocarbyl radical may be unsubstituted or further substituted by for example a halide and/or a hydrocarbyl group; for example, a suitable substituted $C_{1-30}$ hydrocarbyl radical is a pentafluorobenzyl group such as $-CH_2C_6F_5$); a halogen atom; a $C_{1-8}$ alkoxy radical; a $C_{6-10}$ aryl or aryloxy radical (each of which may be further substituted by for example a halide and/or a hydrocarbyl group; for example a suitable $C_{6-10}$ aryl group is a perfluoroaryl group such as $-C_6F_5$); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula $-Si(R')_3$ wherein each R' is independently selected from hydrogen, a $C_{1-8}$ alkyl or alkoxy radical, $C_{6-10}$ aryl or aryloxy radicals; and a germanyl radical of the formula $-Ge(R')_3$ wherein R' is as defined directly above.

The term "activatable ligand" refers to a ligand which may be activated by a cocatalyst (also referred to as an "activator"), to facilitate olefin polymerization. An activatable ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins. In embodiments of the present disclosure, the activatable ligand, X is independently selected from a hydrogen atom; a halogen atom; a $C_{1-10}$ hydrocarbyl radical; a $C_{1-10}$ alkoxy radical; a $C_{6-10}$ aryl oxide radical, each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical; an amido radical which is unsubstituted or substituted by up to two $C_{1-8}$ alkyl radicals; and a phosphido radical which is unsubstituted or substituted by up to two $C_{1-8}$ alkyl radicals. Two activatable X ligands may also be joined to one another and form for example, a substituted or unsubstituted diene ligand (i.e., 1,3-diene); or a delocalized heteroatom containing group such as an acetate group.

The number of activatable ligands depends upon the valency of the metal and the valency of the activatable ligand. In some embodiments the phosphinimine catalysts are based on group 4 metals in their highest oxidation state (i.e., $4^+$). Particularly suitable activatable ligands are monoanionic such as a halide (e.g., chloride) or a hydrocarbyl (e.g., methyl, benzyl).

In some instances, the metal of the phosphinimine catalyst may not be in the highest oxidation state. For example, a titanium (III) component would contain only one activatable ligand.

In an embodiment of the disclosure, the phosphinimine catalyst has the formula, (L)(PI)MX$_2$, where M is Ti, Zr or Hf; PI is a phosphinimine ligand having the formula R$_3$P=N—, where R is independently selected from hydrogen, halogen, and $C_1$-$C_{20}$ hydrocarbyl; L is a ligand selected from cyclopentadienyl, substituted cyclopentadienyl, indenyl, substituted indenyl, fluorenyl, and substituted fluorenyl; and X is an activatable ligand.

In an embodiment of the disclosure, the phosphinimine catalyst has the formula: (L)((t-Bu)$_3$P=N)TiX$_2$, where L is a ligand selected from cyclopentadienyl, substituted cyclopentadienyl, indenyl, and substituted indenyl; and X is an activatable ligand.

In an embodiment of the disclosure, the phosphinimine catalyst has the formula: (L)((t-Bu)$_3$P=N)TiX$_2$, where L is a ligand selected from a substituted cyclopentadienyl and substituted indenyl; and X is an activatable ligand.

In an embodiment of the disclosure, the phosphinimine catalyst contains a phosphinimine ligand, a cyclopentadienyl ligand ("Cp" for short) and two chloride or two methyl ligands bonded to the group 4 metal.

In an embodiment of the disclosure, the phosphinimine catalyst contains a phosphinimine ligand, a singly or multiply substituted cyclopentadienyl ligand and two chloride or two methyl ligands bonded to the group 4 metal.

In an embodiment of the disclosure, the phosphinimine catalyst contains a phosphinimine ligand, a perfluoroaryl substituted cyclopentadienyl ligand and two chloride or two methyl ligands bonded to the group 4 metal.

In an embodiment of the disclosure, the phosphinimine catalyst contains a phosphinimine ligand, a perfluorophenyl substituted cyclopentadienyl ligand (i.e., Cp-$C_6F_5$) and two chloride or two methyl ligands bonded to the group 4 metal.

In an embodiment of the disclosure, the phosphinimine catalyst contains a 1,2-substituted cyclopentadienyl ligand and a phosphinimine ligand which is substituted by three tertiary butyl substituents.

In an embodiment of the disclosure, the phosphinimine catalyst contains a 1,2 substituted cyclopentadienyl ligand (e.g., a 1,2-(R*)(Ar—F)Cp) where the substituents are selected from R* a hydrocarbyl group, and Ar—F a perfluorinated aryl group, a 2,6 (i.e., ortho) fluoro substituted phenyl group, a 2,4,6 (i.e., ortho/para) fluoro substituted phenyl group, or a 2,3,5,6 (i.e. ortho/meta) fluoro substituted phenyl group respectively.

In the present disclosure, 1,2 substituted cyclopentadienyl ligands such as for example 1,2-(R*)(Ar—F)Cp ligands may contain as impurities 1,3 substituted analogues such as for example 1,3-(R*)(Ar—F)Cp ligands. Hence, phosphinimine catalysts having a 1,2 substituted Cp ligand may contain as an impurity, a phosphinimine catalyst having a 1,3 substituted Cp ligand. Alternatively, the current disclosure contemplates the use of 1,3 substituted Cp ligands as well as the use of mixtures of varying amounts of 1,2 and 1,3 substituted Cp ligands to give phosphinimine catalysts having 1,3 substituted Cp ligands or mixed phosphinimine catalysts having 1,2 and 1,3 substituted Cp ligands.

In an embodiment of the disclosure, the phosphinimine catalyst has the formula: (1,2-(R*)(Ar—F)Cp)M(N=P(t-Bu)$_3$)X$_2$ where R* is a hydrocarbyl group; Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e., ortho/meta) fluoro substituted phenyl group; M is Ti, Zr or Hf; and X is an activatable ligand. In an embodiment of the disclosure, the phosphinimine catalyst has the formula: (1,2—(R*)(Ar—F)Cp)M(N=P(t-Bu)$_3$)X$_2$ where R* is an alkyl group; Ar—F is a perfluorinated aryl group, a 2,6 (i.e., ortho) fluoro substituted phenyl group, a 2,4,6 (i.e., ortho/para) fluoro substituted phenyl group or a 2,3,5,6 (i.e., ortho/meta) fluoro substituted phenyl group; M is Ti, Zr or Hf; and X is an activatable ligand. In an embodiment of the disclosure, the phosphinimine catalyst has the formula: (1,2-(R*)(Ar—F)Cp)M(N=P(t-Bu)$_3$)X$_2$ where R* is a hydrocarbyl group having from 1 to 20 carbons; Ar—F is a perfluorinated aryl group; M is Ti, Zr or Hf; and X is an activatable ligand. In an embodiment of the disclosure, the phosphinimine catalyst has the formula: (1,2-(R*)(Ar—F)Cp)M(N=P(t-Bu)$_3$)X$_2$ where R* is a straight chain alkyl group; Ar—F is a perfluorinated aryl group, a 2,6 (i.e., ortho) fluoro substituted phenyl group, a 2,4,6 (i.e., ortho/para) fluoro substituted phenyl group, or a 2,3,5,6 (i.e., ortho/meta) fluoro substituted phenyl group; M is Ti, Zr or Hf; and X is an activatable ligand. In an embodiment of the disclosure, the phosphinimine catalyst has the formula: (1,2-(n-R*)(Ar—F)Cp)Ti(N=P(t-Bu)$_3$)X$_2$ where R* is a straight chain alkyl group; Ar—F is a perfluorinated aryl group; M is Ti, Zr or Hf; and X is an activatable ligand. In an embodiment of the disclosure, the phosphinimine catalyst has the formula: (1,2-(R*)($C_6F_5$)Cp)M(N=P(t-Bu)$_3$)X$_2$ where R* is a hydrocarbyl group having 1 to 20 carbon atoms; M is Ti, Zr or Hf; and X is an activatable ligand. In an embodiment of the disclosure, the phosphinimine catalyst has the formula: (1,2-(n-R*)($C_6F_5$)Cp)M(N=P(t-Bu)$_3$)X$_2$ where R* is a straight chain alkyl group; M is Ti, Zr or Hf; and X is an activatable ligand. In further embodiments, M is Ti and R* is any one of a methyl, ethyl, n-propyl, n-butyl, n-pentyl, n-hexyl, n-heptyl, and n-octyl group. In further embodiments, X is chloride or methide.

The term "perfluorinated aryl group" means that each hydrogen atom attached to a carbon atom in an aryl group has been replaced with a fluorine atom as is well understood in the art (e.g., a perfluorinated phenyl group or substituent has the formula —$C_6F_5$). In embodiments of the disclosure, Ar—F is selected from perfluorinated phenyl or perfluorinated naphthyl groups.

Some phosphinimine catalysts which may be used in the present disclosure include: ((C$_6$F$_5$)Cp)Ti(N=P(t-Bu)$_3$)Cl$_2$; (1,2-(n-propyl)(C$_6$F$_5$)Cp)Ti(N=P(t-Bu)$_3$)Cl$_2$, (1,2-(n-butyl)(C$_6$F$_5$)Cp)Ti(N=P(t-Bu)$_3$)Cl$_2$ and (1,2-(n-hexyl)(C$_6$F$_5$)Cp)Ti(N=P(t-Bu)$_3$)Cl$_2$.

In an embodiment of the disclosure, the phosphinimine catalyst will have a single or multiply substituted indenyl ligand and a phosphinimine ligand which is substituted by three tertiary butyl substituents.

An indenyl ligand (or "Ind" for short) as defined in the present disclosure will have framework carbon atoms with the numbering scheme provided below, so the location of a substituent can be readily identified.

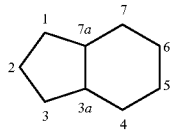

In an embodiment of the disclosure, the phosphinimine catalyst will have a singly substituted indenyl ligand and a phosphinimine ligand which is substituted by three tertiary butyl substituents.

In an embodiment of the disclosure, the phosphinimine catalyst will have a singly or multiply substituted indenyl ligand where the substituent is selected from a substituted or unsubstituted alkyl group, a substituted or an unsubstituted aryl group, and a substituted or unsubstituted benzyl (e.g., C$_6$H$_5$CH$_2$—) group. Suitable substituents for the alkyl, aryl or benzyl group may be selected from alkyl groups, aryl groups, alkoxy groups, aryloxy groups, alkylaryl groups (e.g., a benzyl group), arylalkyl groups and halide groups.

In an embodiment of the disclosure, the phosphinimine catalyst will have a singly substituted indenyl ligand, R$^2$-Indenyl, where the R$^2$ substituent is a substituted or unsubstituted alkyl group, a substituted or an unsubstituted aryl group, or a substituted or unsubstituted benzyl group. Suitable substituents for an R$^2$ alkyl, R$^2$ aryl or R$^2$ benzyl group may be selected from alkyl groups, aryl groups, alkoxy groups, aryloxy groups, alkylaryl groups (e.g. a benzyl group), arylalkyl groups and halide groups.

In an embodiment of the disclosure, the phosphinimine catalyst will have an indenyl ligand having at least a 1-position substituent (1-R$^2$) where the substituent R$^2$ is a substituted or unsubstituted alkyl group, a substituted or an unsubstituted aryl group, or a substituted or unsubstituted benzyl group. Suitable substituents for an R$^2$ alkyl, R$^2$ aryl or R$^2$ benzyl group may be selected from alkyl groups, aryl groups, alkoxy groups, aryloxy groups, alkylaryl groups (e.g. a benzyl group), arylalkyl groups and halide groups.

In an embodiment of the disclosure, the phosphinimine catalyst will have a singly substituted indenyl ligand, 1-R$^2$-Indenyl where the substituent R$^2$ is in the 1-position of the indenyl ligand and is a substituted or unsubstituted alkyl group, a substituted or unsubstituted aryl group, or a substituted or an unsubstituted benzyl group. Suitable substituents for an R$^2$ alkyl, R$^2$ aryl or R$^2$ benzyl group may be selected from alkyl groups, aryl groups, alkoxy groups, aryloxy groups, alkylaryl groups (e.g., a benzyl group), arylalkyl groups and halide groups.

In an embodiment of the disclosure, the phosphinimine catalyst will have a singly substituted indenyl ligand, 1-R$^2$-Indenyl, where the substituent R$^2$ is a (partially/fully) halide substituted alkyl group, a (partially/fully) halide substituted benzyl group, or a (partially/fully) halide substituted aryl group.

In an embodiment of the disclosure, the phosphinimine catalyst will have a singly substituted indenyl ligand, 1-R$^2$-Indenyl, where the substituent R$^2$ is a (partially/fully) halide substituted benzyl group.

When present on an indenyl ligand, a benzyl group can be partially or fully substituted by halide atoms, for example, fluoride atoms. The aryl group of the benzyl group may be a perfluorinated aryl group, a 2,6 (i.e., ortho) fluoro substituted phenyl group, 2,4,6 (i.e., ortho/para) fluoro substituted phenyl group or a 2,3,5,6 (i.e., ortho/meta) fluoro substituted phenyl group respectively. The benzyl group is, in an embodiment of the disclosure, located at the 1 position of the indenyl ligand.

In an embodiment of the disclosure, the phosphinimine catalyst will have a singly substituted indenyl ligand, 1-R$^2$-Indenyl, where the substituent R$^2$ is a pentafluorobenzyl (C$_6$F$_5$CH$_2$—) group.

In an embodiment of the disclosure, the phosphinimine catalyst has the formula: (1-R$^2$-(Ind))M(N=P(t-Bu)$_3$)X$_2$ where R$^2$ is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; M is Ti, Zr or Hf; and X is an activatable ligand.

In an embodiment of the disclosure, the phosphinimine catalyst has the formula: (1-R$^2$-(Ind))M(N=P(t-Bu)$_3$)X$_2$ where R$^2$ is an alkyl group, an aryl group or a benzyl group and wherein each of the alkyl group, the aryl group, and the benzyl group may be unsubstituted or substituted by at least one fluoride atom; M is Ti, Zr or Hf; and X is an activatable ligand.

In an embodiment of the disclosure, the phosphinimine catalyst has the formula: (1-R$^2$-(Ind))M(N=P(t-Bu)$_3$)X$_2$ where R$^2$ is an alkyl group, an aryl group or a benzyl group and wherein each of the alkyl group, the aryl group, and the benzyl group may be unsubstituted or substituted by at least one halide atom; M is Ti, Zr or Hf; and X is an activatable ligand.

In an embodiment of the disclosure, the phosphinimine catalyst has the formula: (1-R$^2$-(Ind))Ti(N=P(t-Bu)$_3$)X$_2$ where R$^2$ is an alkyl group, an aryl group or a benzyl group and wherein each of the alkyl group, the aryl group, and the benzyl group may be unsubstituted or substituted by at least one fluoride atom; and X is an activatable ligand.

In an embodiment of the disclosure, the phosphinimine catalyst has the formula: (1-C$_6$F$_5$CH$_2$-Ind)M(N=P(t-Bu)$_3$)X$_2$, where M is Ti, Zr or Hf; and X is an activatable ligand.

In an embodiment of the disclosure, the phosphinimine catalyst has the formula: (1-C$_6$F$_5$CH$_2$-Ind)Ti(N=P(t-Bu)$_3$)X$_2$, where X is an activatable ligand.

The Cocatalyst

In the present disclosure, the single site catalyst is used in combination with at least one activator (or "cocatalyst") to form an active polymerization catalyst system for olefin polymerization. Activators (i.e., cocatalysts) include ionic activator cocatalysts and hydrocarbyl aluminoxane cocatalysts.

The activator used to activate the single site catalyst can be any suitable activator including one or more activators selected from alkylaluminoxanes and ionic activators, optionally together with an alkylating agent.

Without wishing to be bound by theory, the alkylaluminoxanes are complex aluminum compounds of the formula:

$R^3{}_2Al^1O(R^3Al^1O)_mAl^1R^3{}_2$, wherein each $R^3$ is independently selected from $C_{1-20}$ hydrocarbyl radicals and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the disclosure, $R^3$ of the alkylaluminoxane, is a methyl radical and m is from 10 to 40.

The alkylaluminoxanes may be used in substantial molar excess compared to the amount of group 4 transition metal in the single site catalyst. The $Al^1$:group 4 transition metal molar ratios are from 10:1 to 10,000:1, for example, about 30:1 to 500:1.

It is well known in the art, that the alkylaluminoxane can serve dual roles as both an alkylator and an activator. Hence, an alkylaluminoxane activator is often used in combination with activatable ligands such as halogens.

Alternatively, the activator of the present disclosure may be a combination of an alkylating agent (which may also serve as a scavenger) with an activator capable of ionizing the group 4 metal of the single site catalyst (i.e., an ionic activator). In this context, the activator can be chosen from one or more alkylaluminoxane and/or an ionic activator.

When present, the alkylating agent may be selected from $(R^4)_pMgX^2{}_{2-p}$ wherein $X^2$ is a halide and each $R^4$ is independently selected from alkyl radicals and p is 1 or 2; $R^4Li$ wherein in $R^4$ is as defined above, $(R^4)_qZnX^2{}_{2-q}$ wherein $R^4$ is as defined above, $X^2$ is halogen and q is 1 or 2; $(R^4)_sAl^2X^2{}_{3-s}$ wherein $R^4$ is as defined above, $X^2$ is halogen and s is an integer from 1 to 3. In some embodiments, in the above compounds, $R^4$ is a $C_{1-4}$ alkyl radical, and $X^2$ is chlorine. Commercially available compounds include triethyl aluminum (TEAL), diethyl aluminum chloride (DEAC), dibutyl magnesium ($(Bu)_2Mg$), and butyl ethyl magnesium (BuEtMg or BuMgEt).

The ionic activator may be selected from: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from phenyl radicals which are unsubstituted or substituted with from 3 to 5 substituents selected from a fluorine atom, a $C_{1-4}$ alkyl or alkoxy radical which is unsubstituted or substituted by a fluorine atom; and a silyl radical of the formula —Si—$(R^7)_3$; wherein each $R^7$ is independently selected from a hydrogen atom and a $C_{1-4}$ alkyl radical; and (ii) compounds of the formula $[(R^8)_tZH]^+[B(R^6)_4]^-$ wherein B is a boron atom, H is a hydrogen atom, Z is a nitrogen atom or phosphorus atom, t is 2 or 3 and $R^8$ is selected from $C_{1-8}$ alkyl radicals, a phenyl radical which is unsubstituted or substituted by up to three $C_{1-4}$ alkyl radicals, or one $R^8$ taken together with a nitrogen atom may form an anilinium radical and $R^6$ is as defined above; and (iii) compounds of the formula $B(R^6)_3$ wherein $R^6$ is as defined above.

In some embodiments in the above compounds $R^6$ is a pentafluorophenyl radical, and $R^5$ is a triphenylmethyl cation, Z is a nitrogen atom and $R^8$ is a $C_{1-4}$ alkyl radical or one $R^8$ taken together with a nitrogen atom forms an anilinium radical (e.g. $PhR^8{}_2NH^+$, which is substituted by two $R^8$ radicals such as for example two $C_{1-4}$ alkyl radicals).

Examples of compounds capable of ionizing the single site catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl)boron, tributylammonium tetra(m,m-dimethylphenyl) boron, tributylammonium tetra(p-trifluoromethylphenyl) boron, tributylammonium tetra(pentafluorophenyl)boron, tri (n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl) boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltrispentafluorophenyl borate, triphenylmethylium phenyltrispentafluorophenyl borate, benzene (diazonium) phenyltrispentafluorophenyl borate, tropillium tetrakis (2,3, 5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4, 5-trifluorophenyl) borate, benzene (diazonium) tetrakis (3,4, 5-trifluorophenyl) borate, tropillium tetrakis (1,2,2-trifluoroethenyl) borate, trophenylmethylium tetrakis (1,2, 2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3, 4,5-tetrafluorophenyl) borate, and benzene (diazonium) tetrakis (2,3,4,5-tetrafluorophenyl) borate.

Commercially available activators which are capable of ionizing the group 4 metal of the single site catalyst include: N,N-dimethylaniliniumtetrakispentafluorophenyl borate ("$[Me_2NHPh][B(C_6F_5)_4]$"); triphenylmethylium tetrakispentafluorophenyl borate ("$[Ph_3C][B(C_6F_5)_4]$"); and trispentafluorophenyl boron and MAO (methylaluminoxane) and MMAO (modified methylaluminoxane).

The ionic activators compounds may be used in amounts which provide a molar ratio of group 4 transition metal to boron that will be from 1:1 to 1:6.

Optionally, mixtures of alkylaluminoxanes and ionic activators can be used as activators in the polymerization catalyst.

The Support

In the present disclosure, the single site catalyst may be supported on an inert support. The support used in the present disclosure can be any support known in the art to be suitable for use with polymerization catalysts. For example the support can be any porous or non-porous support material, such as talc, inorganic oxides, inorganic chlorides, aluminophosphates (i.e. $AlPO_4$) and polymer supports (e.g., polystyrene, etc.). Example supports include Group 2, 3, 4, 5, 13 and 14 metal oxides, for example, alumina, silica-alumina, magnesium oxide, magnesium chloride, zirconia, titania, clay (e.g., montmorillonite) and mixtures thereof.

Agglomerate supports such as agglomerates of silica and clay may also be used as a support in the current disclosure.

Supports are generally used in calcined form. An inorganic oxide support, for example, will contain acidic surface hydroxyl groups which will react with a polymerization catalyst. Prior to use, the inorganic oxide may be dehydrated to remove water and to reduce the concentration of surface hydroxyl groups.

Calcination or dehydration of a support is well known in the art. In embodiments of the disclosure, the support is calcined at temperatures above 200° C., or above 300° C., or above, 400° C., or above 500° C. In other embodiments, the support is calcined at from about 500° C. to about 1000° C., or from about 600° C. to about 900° C. The resulting support may be free of adsorbed water and may have a surface hydroxyl content from about 0.1 to 5 mmol/g of support, or from 0.5 to 3 mmol/g. The amount of hydroxyl groups in a silica support may be determined according to the method disclosed by J. B. Peri and A. L. Hensley Jr., in J. Phys. Chem., 72 (8), 1968, pg. 2926.

The support material, especially an inorganic oxide, such as silica for example, has a surface area of from about 10 to about 700 $m^2$/g, a pore volume in the range from about 0.1 to about 4.0 cc/g and an average particle size of from about 5 to about 500 μm. In a specific embodiment, the support material has a surface area of from about 50 to about 500 $m^2$/g, a pore volume in the range from about 0.5 to about 3.5 cc/g and an average particle size of from about 10 to about 200 μM. In another specific embodiment the support material has a surface area of from about 100 to about 400 $m^2$/g, a pore volume in the range from about 0.8 to about 3.0 cc/g and an average particle size of from about 5 to about 100 μm.

The support material, especially an inorganic oxide, such as silica for example, has an average pore size (i.e., pore diameter) of from about 10 to about 1000 Angstroms (Å). In a specific embodiment, the support material has an average pore size of from about 50 to about 500 Å. In another specific embodiment, the support material has an average pore size of from about 75 to about 350 Å.

The surface area and pore volume of a support may be determined by nitrogen adsorption according to B.E.T. techniques, which are well known in the art and are described in the Journal of the American Chemical Society, 1938, v 60, pp 309-319.

A silica support which is suitable for use in the present disclosure has a high surface area and is amorphous. By way of non-limiting example, useful silicas are commercially available under the trademark of Sylopol® 958, 955 and 2408™ from Davison Catalysts, a Division of W. R. Grace and Company and ES-70W by PQ Corporation.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,968,375.

An agglomerate of clay and inorganic oxide which may be useful in the current disclosure may have the following properties: a surface area of from about 20 to about 800 $m^2$/g, or for example, from 50 to about 600 $m^2$/g; particles with a bulk density of from about 0.15 to about 1 g/ml, or for example, from about 0.20 to about 0.75 g/ml; an average pore diameter of from about 30 to about 300 Angstroms (Å), or for example, from about 60 to about 150 Å; a total pore volume of from about 0.10 to about 2.0 cc/g, or for example, from about 0.5 to about 1.8 cc/g; and an average particle size of from about 4 to 150 microns (μm), or for example, from about 8 to 100 microns.

Optionally, a support, for example a silica support, may be treated with one or more salts of the type: $Zr(SO_4)_2 \cdot 4H_2O$, $ZrO(NO_3)_2$, and $Fe(NO_3)_3$ as taught in CA Patent Application No. 2,716,772. Supports that have been otherwise chemically treated are also contemplated for use with the catalysts and processes of the present disclosure.

Without wishing to be bound by theory, $Zr(SO_4)_2 \cdot 4H_2O$ and $ZrO(NO_3)_2$ may each act as a source of zirconium oxide (i.e. $ZrO_2$) which may form for example after calcinations temperatures are employed. Alternately, the $Zr(SO_4)_2 \cdot 4H_2O$ can be used to add $Zr(SO_4)_2$ to an inert support if suitably high calcinations temperatures (those which promote formation of zirconium oxide) are not employed.

The present disclosure is not limited to any particular procedure for supporting the single site catalyst or the cocatalyst. Processes for depositing a single site catalyst complex and/or a cocatalyst on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright © 2001 by John Wiley & Sons, Inc.; for some non-limiting methods to support a phosphinimine single site catalyst see U.S. Pat. No. 5,965,677). For example, the single site catalyst may be added to a support by co-precipitation with the support material. The cocatalyst can be added to a support before and/or after the single site catalyst or together with the single site catalyst (e.g., a phosphinimine catalyst may be mixed with a cocatalyst in a suitable solvent or diluents and the mixture added to a support). Optionally, the cocatalyst can be added to a supported single site catalyst in situ or on route to a reactor. The single site catalyst and/or cocatalyst may be slurried or dissolved in a suitable diluent or solvent respectively and then added to a support. Suitable solvents or diluents include but are not limited to hydrocarbons and mineral oil. The single site catalyst may be added to the solid support, in the form of a solid, solution or slurry, followed by the addition of the cocatalyst in solid form or as a solution or slurry. The cocatalyst may be added to the solid support, in the form of a solid, solution or slurry, followed by the addition of the single site catalyst in solid form or as a solution or slurry. Single site catalyst, cocatalyst, and support can be mixed together in the presence or absence of a diluent or solvent, but use of diluent(s) or solvent(s) is preferred in some embodiments.

The Ethylene Copolymer Composition

In the present disclosure, the term "ethylene copolymer" is used interchangeably with the term "copolymer", or "polyethylene copolymer" and all connote a polymer consisting of polymerized ethylene units and at least one type of polymerized alpha olefin.

In the present disclosure, the first and second ethylene copolymer compositions are not specifically defined, however by way of providing some non-limiting embodiments, the following possible properties are provided.

The First Ethylene Copolymer

In embodiments of the disclosure, the first ethylene copolymer composition will comprise at least 75 weight % of ethylene units, or at least 80 wt % of ethylene units, or at least 85 wt % of ethylene units with the balance being an alpha-olefin unit, based on the weight of the ethylene copolymer composition.

In embodiments of the disclosure, the first ethylene copolymer may have a melt index ($I_2$) of from 0.01 to 10 g/10 min, or from 0.1 to 10 g/10 min, or from 0.25 to 10 g/10 min, or from 0.5 to 10 g/10 min, or from 0.5 to 7.5 g/10 min, or from 0.5 to 6.0 g/10 min, or from 0.75 to 10 g/10 min, or from 0.75 to 7.5 g/10 min, or from 0.75 to 6.0 g/10 min, or from 1.0 to 10 g/10 min, or from 1.0 to 7.5 g/10 min, or from 1.0 to 6.0 g/10 min, or greater than 1.0 and up to 10 g/10 min, or greater than 1.0 g/10 min, or greater than 1.5 g/10 min, or greater than 2.0 g/10 min.

In embodiments of the disclosure, the first ethylene copolymer may have a density of from 0.912 g/cc to 0.937 g/cc including narrower ranges within this range, such as for example, from 0.912 to 0.936 g/cc, or from 0.912 g/cc to 0.935 g/cc, or from 0.916 g/cc to 0.935 g/cc, or from 0.916 g/cc to 0.932 g/cc, or from 0.916 g/cc to 0.930 g/cc, or from 0.917 g/cc to 0.935 g/cc, or from 0.917 g/cc to 0.932 g/cc, or from 0.917 g/cc to 0.930 g/cc, or from 0.916 g/cc to 0.925 g/cc, or from 0.917 g/cc to 0.927 g/cc, or from 0.917 g/cc to 0.926 g/cc, or from 0.917 g/cc to 0.925 g/cc, or from 0.917 g/cc to 0.923 g/cc, or from 0.918 g/cc to 0.932 g/cc, or from 0.918 g/cc to 0.930 g/cc, or from 0.918 to 0.928 g/cc, or from 0.920 to 0.935 (note: "g" stands for gram; "cc" stands for cubic centimeter, $cm^3$)

The first ethylene copolymer of the present disclosure may have a unimodal, broad unimodal, bimodal, or multi-modal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal profile. By the term "bimodal" it is meant that in addition to a first peak, there will be a secondary peak or shoulder which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more maxima in a molecular weight distribution curve generated according to the method of ASTM D6474-99.

In an embodiment of the disclosure, the first ethylene copolymer will have a unimodal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal distribution curve or profile.

In embodiments of the disclosure, the first ethylene copolymer may exhibit a weight average molecular weight ($M_w$) as determined by gel permeation chromatography (GPC) of from 10,000 to 250,000, including narrower ranges within this range, such as, for example, from 20,000 to 200,000, or from 25,000 to 175,000, or from 10,000 to 150,000, or from 10,000 to 125,000, or from 10,000 to 100,000.

In embodiments of the disclosure, the first ethylene copolymer may exhibit a number average molecular weight ($M_n$) as determined by gel permeation chromatography (GPC) of from 1,000 to 100,000 including narrower ranges within this range, such as for example from 2,500 to 100,000, or from 2,500 to 75,000, or from 1,000 to 50,000, or from 5,000 to 100,000, or from 5,000 to 75,000, or from 5,000 to 50,000, or from 5,000 to 25,000, or from 1,000 to 75,000, or from 1,000 to 50,000, or from 1,000 to 25,000, or from 1,000 to 15,000.

In embodiments of the disclosure, the first ethylene copolymer may exhibit a Z-average molecular weight ($M_z$) as determined by gel permeation chromatography (GPC) of from 50,000 to 1,000,000 including narrower ranges within this range, such as for example from 75,000 to 750,000, or from 100,000 to 500,000, or from 100,000 to 400,000, or from 125,000 to 375,000, or from 150,000 to 350,000, or from 175,000 to 375,000, or from 175,000 to 400,000, or from 200,000 to 400,000 or from 225,000 to 375,000.

In embodiments of the disclosure, the first ethylene copolymer may have a molecular weight distribution ($M_w/M_n$) as determined by gel permeation chromatography (GPC) of from 3.0 to 7.0, including narrower ranges within this range, such as for example, from 3.5 to 7.0, or from 3.5 to 6.5, or from 3.5 to 6.0, or from 3.6 to 6.5, or from 3.6 to 6.0, or from 3.5 to 5.5, or from 3.6 to 5.5, or from 3.5 to 5.0, or from 4.5 to 6.0, or from 4.0 to 6.0, or from 4.0 to 5.5.

In embodiments of the disclosure, the first ethylene copolymer may have a Z average molecular weight distribution ($M_z/M_w$) as determined by gel permeation chromatography (GPC) of from 2.0 to 5.5, including narrower ranges within this range, such as for example, from 2.0 to 5.0, or from 2.0 to 4.5, or from 2.0 to 4.0, or from 2.0 to 2.5, or from 2.0 to 3.0, or from 2.0 to 3.5.

In an embodiment of the disclosure, the first ethylene copolymer may have a flat comonomer incorporation profile as measured using Gel-Permeation Chromatography with Fourier Transform Infra-Red detection (GPC-FTIR). In an embodiment of the disclosure, the first ethylene copolymer may have a negative (i.e., "normal") comonomer incorporation profile as measured using GPC-FTIR. In an embodiment of the disclosure, the first ethylene copolymer may have an inverse (i.e., "reverse") or partially inverse comonomer incorporation profile as measured using GPC-FTIR. If the comonomer incorporation decreases with molecular weight, as measured using GPC-FTIR, the distribution is described as "normal" or "negative". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for the copolymer, there is one or more higher molecular weight components having a higher comonomer incorporation than in one or more lower molecular weight segments. The term "reverse(d) comonomer distribution" is used herein to mean, that across the molecular weight range of the ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse".

In an embodiment of the disclosure, the first ethylene copolymer has a reversed comonomer incorporation profile as measured using GPC-FTIR.

In embodiments of the disclosure, the first ethylene copolymer may have a melt flow ratio (the MFR=$I_{21}/I_2$) of from 20 to 60, or from 22 to 60, or from 25 to 60, or from 28 to 60 or from 30 to 60. In further embodiments of the disclosure, the first ethylene copolymer may have an $I_{21}/I_2$ of from 22 to 55, or from 22 to 50, or from 22 to 45, or from 20 to 55, or from 20 to 50, or from 20 to 45, or from 20 to 40, or from 25 to 55, or from 25 to 50, or from 25 to 45, or from 25 to 40, or from 25 to 35, or from 25 to 33, or from 28 to 48, or from 28 to 44. In further embodiments of the disclosure, the first ethylene copolymer may have a MFR of greater than 22, but less than 50, or less than 45, or less than 40, or less than 33. In further embodiments of the disclosure the first ethylene copolymer may have a MFR of less than 45, or less than 40, or less than 35, or less than 33, or at least 25, or at least 22, or at least 20. In further embodiments of the disclosure the first ethylene copolymer may have a MFR of at least 22, or at least 25 while at the same time having a MFR of less than 35, or less than 33.

In embodiments of the disclosure, the first ethylene copolymer may have a composition distribution breadth index CDBI50, as determined by temperature elution fractionation (TREF) of from 40% to 85% by weight, or from 45% to 75% by weight, or from 50% to 75% by weight, or from 55% to 75% by weight, or from 60% to 75% by weight. In embodiments of the disclosure, the first ethylene copolymer may have a $CDBI_{50}$ of from 50% to 70%, or 55% to 70%, or from 50% to 69%, or from 55% to 69%, or from 55% to 65%, or from 60% to 75%, or from 60% to 70%, or from 60% to 69%, or from 55% to 67%, or from 60% to 66% (by weight).

In an embodiment of the disclosure, the first ethylene copolymer may have a $CDBI_{50}$ of from 50 wt % to 77 wt %. In an embodiment of the disclosure, the first ethylene copolymer may have a $CDBI_{50}$ of from 55 wt % to 75 wt %. In an embodiment of the disclosure, the first ethylene copolymer may a $CDBI_{50}$ of from 60 wt % to 73 wt %.

In an embodiment of the disclosure, the first ethylene copolymer may have a TREF profile, as measured by temperature rising elution fractionation, which is multi-modal, comprising at least two elution intensity maxima or peaks.

In an embodiment of the disclosure, the first ethylene copolymer may have a multimodal TREF profile comprising at least two elution intensity maxima (or peaks).

In an embodiment of the disclosure, the first ethylene copolymer may have two melting peaks as measured by differential scanning calorimetry (DSC).

The Second Ethylene Copolymer

In embodiments of the disclosure, the second ethylene copolymer composition will comprise at least 75 weight % of ethylene units, or at least 80 wt % of ethylene units, or at least 85 wt % of ethylene units with the balance being an alpha-olefin unit, based on the weight of the ethylene copolymer composition.

In embodiments of the disclosure, the second ethylene copolymer may have a melt index (I2) of from 0.01 to 3.0 g/10 min, or from 0.1 to 2.5 g/10 min, or from 0.1 to 2.0 g/10 min, or from 0.25 to 2.0 g/10 min, or from 0.01 to 1.0 g/10 min, or from 0.1 to 1.0 g/10 min, or less than 1.0 g/10 min, or from 0.01 to less than 1.0 g/10 min, or from 0.1 to less than 1.0 g/10 min, or from 0.25 to 1.0 g/10 min, or from 0.25 to 0.9 g/10 min, or from 0.25 to 0.80 g/10 min, or from 0.20 to 0.9 g/10 min, or from 0.20 to 0.85 g/10 min, or from 0.25 to 0.85 g/10 min. In embodiments of the disclosure, the second ethylene copolymer may have a melt index (I2) of from greater than 1.0 to 2.0 g/10 min, or from greater than 1.0 to 1.75 g/10 min, or from greater than 1.0 to 1.5 g/10 min.

In embodiments of the disclosure, the second ethylene copolymer may have a density of from 0.912 g/cc to 0.937 g/cc including narrower ranges within this range, such as for example, from 0.912 to 0.937 g/cc, or from 0.912 g/cc to 0.935 g/cc, or from 0.916 g/cc to 0.935 g/cc, or from 0.916 g/cc to 0.932 g/cc, or from 0.916 g/cc to 0.930 g/cc, or from 0.917 g/cc to 0.935 g/cc, or from 0.917 g/cc to 0.932 g/cc, or from 0.917 g/cc to 0.930 g/cc, or from 0.916 g/cc to 0.925 g/cc, or from 0.917 g/cc to 0.927 g/cc, or from 0.917 g/cc to 0.926 g/cc, or from 0.917 g/cc to 0.925 g/cc, or from 0.917 g/cc to 0.923 g/cc, or from 0.918 g/cc to 0.932 g/cc, or from 0.918 g/cc to 0.930 g/cc, or from 0.918 to 0.928 g/cc, or from 0.920 to 0.935 (note: "g" stands for gram; "cc" stands for cubic centimeter, $cm^3$)

The second ethylene copolymer of the present disclosure may have a unimodal, broad unimodal, bimodal, or multi-modal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal profile. By the term "bimodal" it is meant that in addition to a first peak, there will be a secondary peak or shoulder which represents a higher or lower molecular weight component (i.e., the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more maxima in a molecular weight distribution curve generated according to the method of ASTM D6474-99.

In an embodiment of the disclosure, the second ethylene copolymer will have a unimodal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal distribution curve or profile.

In embodiments of the disclosure, the second ethylene copolymer may exhibit a weight average molecular weight ($M_w$) as determined by gel permeation chromatography (GPC) of from 30,000 to 250,000, including narrower ranges within this range, such as for example, from 50,000 to 200,000, or from 50,000 to 175,000, or from 75,000 to 150,000, or from 80,000 to 130,000.

In embodiments of the disclosure, the second ethylene copolymer may exhibit a number average molecular weight ($M_n$) as determined by gel permeation chromatography (GPC) of from 5,000 to 100,000 including narrower ranges within this range, such as for example from 7,500 to 100,000, or from 7,500 to 75,000, or from 7,500 to 50,000, or from 10,000 to 100,000, or from 10,000 to 75,000, or from 10,000 to 50,000.

In embodiments of the disclosure, the second ethylene copolymer may exhibit a Z-average molecular weight ($M_z$) as determined by gel permeation chromatography (GPC) of from 50,000 to 1,000,000 including narrower ranges within this range, such as for example from 75,000 to 750,000, or from 100,000 to 500,000, or from 100,000 to 400,000, or from 125,000 to 375,000, or from 150,000 to 350,000, or from 175,000 to 375,000, or from 175,000 to 400,000, or from 200,000 to 400,000 or from 225,000 to 375,000.

In embodiments of the disclosure, the second ethylene copolymer may have a molecular weight distribution ($M_w/M_n$) as determined by gel permeation chromatography (GPC) of from 3.0 to 7.0, including narrower ranges within this range, such as for example, from 3.5 to 7.0, or from 3.5 to 6.5, or from 3.5 to 6.0, or from 3.6 to 6.5, or from 3.6 to 6.0, or from 3.5 to 5.5, or from 3.6 to 5.5, or from 3.5 to 5.0, or from 4.5 to 6.0, or from 4.0 to 6.0, or from 4.0 to 5.5.

In embodiments of the disclosure, the second ethylene copolymer may have a Z average molecular weight distribution ($M_z/M_w$) as determined by gel permeation chromatography (GPC) of from 2.0 to 5.5, including narrower ranges within this range, such as for example, from 2.0 to 5.0, or from 2.0 to 4.5, or from 2.0 to 4.0, or from 2.0 to 2.5, or from 2.0 to 3.0, or from 2.0 to 3.5.

In an embodiment of the disclosure, the second ethylene copolymer may have a flat comonomer incorporation profile as measured using Gel-Permeation Chromatography with Fourier Transform Infra-Red detection (GPC-FTIR). In an embodiment of the disclosure, the second ethylene copolymer may have a negative (i.e., "normal") comonomer incorporation profile as measured using GPC-FTIR. In an embodiment of the disclosure, the second ethylene copolymer may have an inverse (i.e., "reverse") or partially inverse comonomer incorporation profile as measured using GPC-FTIR. If the comonomer incorporation decreases with molecular weight, as measured using GPC-FTIR, the distribution is described as "normal" or "negative". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for the copolymer, there is one or more higher molecular weight components having a higher comonomer incorporation than in one or more lower molecular weight segments. The term "reverse(d) comonomer distribution" is used herein to mean, that across the molecular weight range of the ethylene copolymer, cornonomer contents for the various polymer fractions are not substantially uniform and the higher molecular weight fractions thereof have proportionally higher comonomer contents (i.e., if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse".

In an embodiment of the disclosure the second ethylene copolymer has a reversed comonomer incorporation profile as measured using GPC-FTIR.

In embodiments of the disclosure, the second ethylene copolymer may have a melt flow ratio (the MFR=$I_{21}/I_2$) of from 20 to 60, or from 20 to 50, or from 25 to 60, or from 28 to 60 or from 30 to 60 or from 32 to 60. In further embodiments of the disclosure, the second ethylene copolymer may have an $I_{21}/I_2$ of from 30 to 55, or from 30 to 50, or from 30 to 45, or from 32 to 50 or from 35 to 55, or from 36 to 50, or from 36 to 48, or from 36 to 46, or from 35 to 50, or from greater than 35 to less than 50, or from greater than 35 to 50. In further embodiments of the disclosure, the second ethylene copolymer may have a MFR of at least 25, or at least 28, or at least 30, or at least 32, or at least 33, or greater than 35, or greater than 37, or greater than 40, or greater than 45, or greater than 50.

In embodiments of the disclosure, the second ethylene copolymer may have a melt flow ratio ($I_{21}/I_2$) of from greater than 30 to 60, or from greater than 30 to 50. In an embodiment of the disclosure, the second ethylene copolymer may have a melt flow ratio ($I_{21}/I_2$) of from 32 to 50. In an embodiment of the disclosure, the second ethylene copolymer has a melt flow ratio ($I_{21}/I_2$) of from 35 to 50. In an embodiment of the disclosure, the second ethylene copolymer may have a melt flow ratio ($I_{21}/I_2$) of from 30 to 55. In an embodiment of the disclosure, the second ethylene copolymer may have a melt flow ratio ($I_{21}/I_2$) of from 32 to 55. In an embodiment of the disclosure, the second ethylene copolymer may have a melt flow ratio ($I_{21}/I_2$) of from 35 to 55.

In embodiments of the disclosure, the second ethylene copolymer may have a composition distribution breadth index $CDBI_{50}$, as determined by temperature elution fractionation (TREF) of from 40% to 85% by weight, or from 45% to 75% by weight, or from 50% to 75% by weight, or from 55% to 75% by weight, or from 60% to 75% by weight. In embodiments of the disclosure, the ethylene copolymer may have a $CDBI_{50}$ of from 50% to 70%, or 55% to 70%, or from 50% to 69%, or from 55% to 69%, or from 55% to 65%, or from 60% to 75%, or from 60% to 70%, or from 60% to 69%, or from 55% to 67%, or from 60% to 66% (by weight).

In an embodiment of the disclosure, the second ethylene copolymer may have a $CDBI_{50}$ of from 50 wt % to 77 wt %. In an embodiment of the disclosure, the second ethylene copolymer may a $CDBI_{50}$ of from 55 wt % to 75 wt %. In an embodiment of the disclosure, the second ethylene copolymer may have a $CDBI_{50}$ of from 60 wt % to 73 wt %.

In embodiments of the disclosure, the second ethylene copolymer may have a CY a-parameter (also called the Carreau-Yasuda shear exponent) of from 0.01 to 0.4, or from 0.05 to 0.4, or from 0.05 to 0.3, or from 0.01 to 0.3, or from 0.01 to 0.25, or from 0.05 to 0.30, or from 0.05 to 0.25.

In embodiments of the disclosure, the second ethylene copolymer may have a normalized shear thinning index, SHI @0.1 rad/s (i.e., the $\eta^*_{0.1}/\eta_0$) of from 0.001 to 0.90, or from 0.001 to 0.8, or from 0.001 to 0.5, or less than 0.9, or less than 0.8, or less than 0.5.

In an embodiment of the disclosure, the second ethylene copolymer has a TREF profile, as measured by temperature rising elution fractionation, which is multimodal, comprising at least two elution intensity maxima or peaks.

In an embodiment of the disclosure, the second ethylene copolymer has a multimodal TREF profile comprising at least two elution intensity maxima (or peaks).

In an embodiment of the disclosure, the second ethylene copolymer has two melting peaks as measured by differential scanning calorimetry (DSC).

In embodiments of the disclosure, the second ethylene second copolymer may have a hexane extractables level of ≤≤3.0 wt %, or ≤2.0 wt %, or ≤1.5 wt % or ≤1.0 wt %. In embodiments of the disclosure, the second ethylene copolymer may have a hexane extractables level of from 0.2 to 3.0 wt %, or from 0.2 to 2.5 wt %, or from 0.2 to 2.0 wt %, or from 0.2 to 1.0 wt %.

Reaction Start Up and Polymerization Processes

Copolymerization of ethylene with one or more alpha olefin comonomer to give ethylene copolymers can take place in a fluidized bed gas phase reactor.

A fluidized bed may be formed by the flow of a gaseous fluid through a bed of particles. The direction of flow is opposite gravity. The frictional drag of the gas on the solid particles overcomes the force of gravity and suspends the particles in a fluidized state referred to as the fluidized bed. To maintain the particles in a fluidized state, the superficial gas velocity through the bed must exceed the minimum flow required for fluidization.

In some embodiments a conventional fluidized bed polymerization process for producing ethylene copolymers (or other types of polymers) is carried out by passing a gaseous stream comprising one or more monomers (e.g., ethylene and one or more alpha olefins) continuously through a fluidized bed reactor in the presence of a catalyst at a velocity sufficient to maintain the bed of solid particles in a suspended condition.

A fluidized bed process is typically a cyclical process in which the fluidizing medium, is heated within the reactor by the heat of the polymerization reaction and then passed from the reactor to a compressor unit and from a compressor unit to a cooling unit. After passing through a compressor unit, the cooled fluidizing medium is returned to the polymerization reactor. Hence, the hot gaseous stream exiting from polymerization reactor and which may contain unreacted monomer is continuously withdrawn from the reactor, compressed, cooled and recycled to the reactor. The product polymer (e.g., an ethylene copolymer) is continuously withdrawn from the reactor while make-up monomers (e.g., ethylene and/or alpha olefin comonomers) are added to the reactor system. The addition of monomers to the reactor system may include addition to the reactor per se or any other part of the reactor system such as anywhere in the recycle stream. Make up monomers are added to replace those monomers consumed during polymerization. Fluidization is achieved by a high rate of fluid recycle to and through the bed, for example, on the order of about 50 times the rate of feed or make-up fluid. This high rate of fluid recycle provides the requisite superficial gas velocity needed to maintain the fluidized bed. Minimum superficial gas velocities required to maintain fluidization are from about 0.2 to about 0.5 feet/second and so the superficial gas velocity used during polymerization may be from at least 0.2 feet/second above the minimum flow for fluidization or from about 0.4 to about 0.7 feet/second.

A fluidized bed reactor generally comprises a reaction zone and a velocity reduction zone. The reactor may comprise a generally cylindrical region beneath an expanded section (the velocity reduction zone or disentrainment zone). The reaction zone includes a bed of growing polymer particles, formed polymer particles and a minor amount of catalyst all fluidized by the continuous flow of polymerizable and modifying gaseous components, including inert components in the form of make-up feed and recycle fluid through the reaction zone.

To ensure complete fluidization, the recycle stream and, where desired, at least part of the make-up stream can be returned through a recycle line to the reactor, at an inlet positioned below the fluidized bed. A fluidized bed reactor has a gas distributor plate above the point of return to aid in the distribution of gaseous medium flow and to uniformly fluidize the bed. The distributer plate is a plate with holes in it to allow the passage of the fluidizing or recycle fluids into the reactor. The distributer plate also supports the solid particles (e.g. seed bed particles) prior to start-up (i.e. before the particles are fluidized) or when the reactor system is shut down. The stream passing upwardly through the bed helps remove the heat of reaction generated by the exothermic polymerization reaction.

Make-up fluids, such as monomers may be fed at point below the distributor plate via a feed line and/or recycle line. The composition of the recycle stream may be measured by a gas analyzer and the composition and amount of the make-up stream may be adjusted to maintain an essentially steady state composition within the reaction zone. The gas analyzer may be positioned to receive gas from a point between the velocity reduction zone and heat exchanger, or between a compressor and heat exchanger.

The portion of the gaseous stream flowing through the fluidized bed which did not react in the bed becomes the recycle stream which leaves the reaction zone, passes into the velocity reduction zone above the bed where a major portion of the entrained particles drop back onto the bed thereby reducing solid particle carryover, and on to the compressor and heat exchanger system.

The recycle stream is then compressed in compressor and passed through heat exchanger where the heat of reaction is removed from the recycle stream before it is returned to the bed. Note that the heat exchanger can also be positioned before the compressor. The heat exchanger can be, for example, a shell and tube heat exchanger, with the recycle gas traveling through the tubes.

The recycle stream exiting the heat exchange zone is then returned to the reactor at its base and from there to the fluidized bed by passage through the distributor plate. A deflector may be installed at the inlet to the reactor to prevent contained polymer particles from settling out and agglomerating into a solid mass and to maintain entrained or to re-entrain any particles or liquid which may settle out or become disentrained.

The polymer product is continuously discharged from the reactor using an exit line positioned above the distribution plate. It is desirable to separate any fluid from the product and to return the fluid to the reactor vessel.

In an embodiment of the present disclosure, the polymerization catalyst enters the reactor in solid or liquid form at a point somewhere above the distributer plate through a catalyst feed line. If one or more co-catalysts are to be added separately from the catalyst, as is sometimes the case, the one or more co-catalysts may be introduced separately into the reaction zone where they will react with the catalyst to form the catalytically active reaction product and/or affect the reaction proceeding in the reactor system. However, the catalyst and co-catalyst(s) may be mixed prior to their introduction into the reaction zone.

A continuity additive may be added in situ to the reactor system via an appropriate mechanism such as solid, liquid or slurry feed line.

Optionally, the reactor system may include sensors or probes to detect static levels and changes thereof.

The reaction vessel may, by way of non-limiting example, have an inner diameter of at least about 2 feet, and may be, for example, greater than about 10 feet.

The reactor pressure in a gas phase process may vary from about 100 psig (690 kPa) to about 600 psig (4138 kPa), or for example, in the range of from about 200 psig (1379 kPa) to about 400 psig (2759 kPa, or for example, in the range of from about 250 psig (1724 kPa) to about 350 psig (2414 kPa).

The reactor temperature in a gas phase process may vary from about 30° C. to about 120° C. In embodiments of the disclosure, the reactor temperature is operated at less than about 40° C., or less than about 30° C., or less than about 20° C., or less than about 15° C. below the melting point of the polyolefin being produced. The process can also be run at higher temperatures, such as for example less than about 10° C., or less than about 5° C. below the melting point of the polyolefin being produced. Ethylene copolymers, for example, may have a melting point in the range of approximately 115° C. to 130° C.

The gas phase process may be operated in a condensed mode, where an inert condensable fluid is introduced to the process to help remove the heat of the polymerization reaction. Condensable fluids are sometimes referred to as induced condensing agents or ICA's. For further details of a condensed mode processes see for example U.S. Pat. Nos. 5,342,749 and 5,436,304. An example of a condensable fluid for use with condensed mode operation is n-pentane or isopentane.

In embodiments of the present disclosure the fluidized bed reactor is capable of producing greater than 500 lbs of polymer per hour (227 Kg/hr) to about 175,000 lbs/hr (80,000 Kg/hr) or higher of polymer. In further embodiments, the reactor utilized is capable of producing greater than 1,000 lbs/hr (455 Kg/hr), or greater than 10,000 lbs/hr (4540 Kg/hr), or greater than 25,000 lbs/hr (11,300 Kg/hr), or greater than 35,000 lbs/hr (15,900 Kg/hr), or greater than 50,000 lbs/hr (22,700 Kg/hr), or greater than 65,000 lbs/hr (29,000 Kg/hr).

On start-up, the reactor may be charged with a bed of particulate polymer particles (e.g. the seed bed) before gas flow is initiated. Such particles help to prevent the formation of localized "hot spots" when catalyst feed is initiated. They may be the same as the polymer to be formed or different. When different, they are, in some embodiments, withdrawn with the desired newly formed polymer particles as the first product. Eventually, a fluidized bed consisting of desired polymer particles supplants the start-up bed (or "seed bed").

In embodiment of the disclosure, a fluidized bed gas phase polymerization reactor will be started up at a first polymerization temperature and a first hydrogen concentration to make a first ethylene copolymer, followed by a decrease in the polymerization temperature and a decrease in the hydrogen concentration to make a second ethylene copolymer.

In embodiment of the disclosure, a fluidized bed gas phase polymerization reactor will be started up at a first polymerization temperature and a first hydrogen concentration to make a first ethylene copolymer until stable reactor operability is achieved, followed by a decrease in the polymerization temperature and a decrease in the hydrogen concentration to make a second ethylene copolymer.

In embodiment of the disclosure, a fluidized bed gas phase polymerization reactor will be started up at a first polymerization temperature and a first hydrogen concentration to make a first ethylene copolymer until stable reactor productivity and operability are achieved, followed by a decrease in the polymerization temperature and a decrease in the hydrogen concentration to make a second ethylene copolymer.

"Stable reactor operability", "stable reactor process conditions", "stable process", "stable process conditions" and the like means that one or more of the following conditions are maintained or observed: there is no significant reactor fouling detected, the product can be transferred out of the reactor easily, temperature probes installed to monitor the reactor wall temperature and internal temperatures are stable (e.g., the temperature measurements are not erratic, or they do not deviate significantly to higher and/or lower temperatures), no localized hot spots occur in the reactor, the pressure drop across the distributor bed plate is stable (e.g. no significant deviations in pressure drop), and/or the static probes installed in the reactor are stable (i.e., there are no abrupt changes and/or erratic readings).

Reactor stability may be impacted by the formation of agglomerates and sheets in the reactor. Sheets and agglomerates can impede the transfer of polymer out of the reactor in many ways, such as, for example, by plugging the discharge ports and the transfer lines from the reactor to the product purge bin. If this situation occurs, the polymerization may need to be stopped to remove the blockages. In a "worst-case" scenario, the reactor may need to be shut-down and opened for cleaning. Sometimes sheets may be large enough that they can fall on the bed plate and affect fluidization dynamics in the reactor. In this situation, defluidization of the bed may occur and the reactor may have to be shut-down for cleaning.

"Stable production rate" and the like refer to a condition when the polymer product is being produced at a relatively constant productivity measured in grams of polymer made per gram of polymerization catalyst consumed. For example, by way of non-limiting examples, stable production rates can be a productivity measured in grams of polymer made per grams of catalyst consumed plus or minus about 2.5 percent, or about 5 percent, or about 7.5 percent, or about 10 percent.

In embodiment of the disclosure, a fluidized bed gas phase polymerization reactor will be started up at a first polymerization temperature and a first hydrogen concentration to make a first ethylene copolymer until at least one reactor bed volume has turned over, followed by a decrease in the polymerization temperature and a decrease in the hydrogen concentration to make a second ethylene copolymer.

In an embodiment of the disclosure, the reactor bed volume is defined as the reaction zone volume in the reactor where newly formed polymer and optionally seedbed and/or other particles (e.g., catalyst particles) is/are present in a fluidized state. It is defined as the volume of the reactor from the distributor bed plate (or "bed plate") to the top of the fluidized bed which comprises the polymer and optionally seedbed and/or other fluidized particles. The height from the distributor bed plate to the top of the fluidized particle bed is referred to as the bed height.

A person skilled in the art will realize that other definitions of a reactor bed volume may be employed.

In an embodiment of the disclosure, a fluidized bed gas phase polymerization reactor will be started up at a first polymerization temperature and a first hydrogen concentration to make a first ethylene copolymer having a first melt index, $I_2^A$, a first melt flow ratio, $(I_{21}/I_2)^A$, and a first density, $d^A$, followed by a decrease in the polymerization temperature and a decrease in the hydrogen concentration to make a second ethylene copolymer having a second melt index, $I_2^B$, a second melt flow ratio, $(I_{21}/I_2)^B$, and a second density, $d^B$.

In an embodiment of the disclosure, a fluidized bed gas phase polymerization reactor will be started up at a first polymerization temperature and a first hydrogen concentration to make a first ethylene copolymer having a first melt index, $I_2^A$, a first melt flow ratio, $(I_{21}/I_2)^A$, and a first density, $d^A$, followed by a decrease in the polymerization temperature and a decrease in the hydrogen concentration to make a second ethylene copolymer having a second melt index, $I^2_B$, a second melt flow ratio, $(I_{21}/I_2)^B$, and a second density, $d_B$, where the first melt index $I_2^A$ is greater than the second melt index $I_2^B$.

In embodiments of the disclosure, a gas phase polymerization will be started up by a process comprising:

a) fluidizing a bed of polymer particles in a reactor with a gas mixture comprising ethylene and one or more alpha olefin at a first hydrogen concentration $[H_2]^A$;

b) introducing a single site catalyst system to the reactor to initiate a polymerization reaction;

c) polymerizing the ethylene and the one or more alpha olefin at a first reactor temperature, $T^A$ to give a first ethylene copolymer with a first melt index, $I_2^A$, a first melt flow ratio, $(I_{21}/I_2)^A$, and a first density, $d^A$ until the process conditions are stabilized and maintained for at least 2 hours, or at least 4 hours, or at least 6 hours, or at least 8 hours, or at least 10 hours, or at least 12 hours, or at least 14 hours, or at least 16 hours, or at least 18 hours, or at least 20 hours, or at least 22 hours, or at least 24 hours; and d) subsequently reducing the hydrogen concentration and the reaction temperature to a second hydrogen concentration $[H_2]^B$ and a second reactor temperature $T^B$, respectively, to give a second ethylene copolymer with a second melt index, $I_2^B$, a second melt flow ratio, $(I_{21}/I_2)^B$, and a second density, $d^B$; where the first melt index, $I_2^A$ is greater than the second melt index, $I_2^B$.

In embodiments of the disclosure, a gas phase polymerization will be started up by a process comprising:

a) fluidizing a bed of polymer particles in a reactor with a gas mixture comprising ethylene and one or more alpha olefin at a first hydrogen concentration $[H_2]^A$;

b) introducing a single site catalyst system to the reactor to initiate a polymerization reaction;

c) polymerizing the ethylene and the one or more alpha olefin at a first reactor temperature, $T^A$ to give a first ethylene copolymer with a first melt index, $I_2^A$, a first melt flow ratio, $(I_{21}/I_2)^A$, and a first density, $d^A$ until the production rate is stabilized and maintained for at least 2 hours, or at least 4 hours, or at least 6 hours, or at least 8 hours, or at least 10 hours, or at least 12 hours, or at least 14 hours, or at least 16 hours, or at least 18 hours, or at least 20 hours, or at least 22 hours, or at least 24 hours; and d) subsequently reducing the hydrogen concentration and the reaction temperature to a second hydrogen concentration $[H_2]^B$ and a second reactor temperature $T^B$, respectively, to give a second ethylene copolymer with a second melt index, $I_2^B$, a second melt flow ratio, $(I_{21}/I_2)^B$, and a second density, $d^B$; where the first melt index, $I_2^A$ is greater than the second melt index, $I_2^B$.

In embodiments of the disclosure, a gas phase polymerization will be started up by a process comprising:

a) fluidizing a bed of polymer particles in a reactor with a gas mixture comprising ethylene and one or more alpha olefin at a first hydrogen concentration $[H_2]^A$;

b) introducing a single site catalyst system to the reactor to initiate a polymerization reaction;

c) polymerizing the ethylene and the one or more alpha olefin at a first reactor temperature, $T^A$ to give a first ethylene copolymer with a first melt index, $I_2^A$, a first melt flow ratio, $(I_{21}/I_2)^A$, and a first density, $d^A$ until the process conditions and production rate are stabilized and maintained for at least 2 hours, or at least 4 hours, or at least 6 hours, or at least 8 hours, or at least 10 hours, or at least 12 hours, or at least 14 hours, or at least 16 hours, or at least 18 hours, or at least 20 hours, or at least 22 hours, or at least 24 hours; and d) subsequently reducing the hydrogen concentration and the reaction temperature to a second hydrogen concentration $[H_2]^B$ and a second reactor temperature $T^B$, respectively, to give a second ethylene copolymer with a second melt index, $I_2^B$, a second melt flow ratio, $(I_{21}/I_2)^B$, and a second density, $d^B$; where the first melt index, $I_2^A$ is greater than the second melt index, $I_2^B$.

In embodiments of the disclosure, a gas phase polymerization will be started up by a process comprising:

a) fluidizing a bed of polymer particles in a reactor with a gas mixture comprising ethylene and one or more alpha olefin at a first hydrogen concentration $[H_2]^A$;

b) introducing a single site catalyst system to the reactor to initiate a polymerization reaction;

c) polymerizing the ethylene and the one or more alpha olefin at a first reactor temperature, $T^A$ to give a first ethylene copolymer with a first melt index, $I_2^A$, a first melt flow ratio, $(I_{21}/I_2)^A$, and a first density, $d^A$, until at least 1, or at least 2, or at least 3, or at least 4, or at least 5, or at least 6, or at least 7, or at least 8, or at least 9, or at least 10, or at least 11, or at least 12, reactor bed volume(s) has turned over, where a reactor bed volume is defined as the volume of the reactor from a reactor distributor bed plate to the top of the fluidized bed; and d) subsequently reducing the hydrogen concentration and the reaction temperature to a second hydrogen concentration $[H_2]^B$ and a second reactor temperature $T^B$, respectively, to give a second ethylene copolymer with a second melt index, $I_2^B$, a second melt flow ratio, $(I_{21}/I_2)^B$, and a second density, $d^B$; where the first melt index, $I_2^A$ is greater than the second melt index, $I_2^B$.

In embodiments of the disclosure, the first reactor temperature, $T^A$ and the second reactor temperature, $T^B$ differ by at least 0.5° C., or at least 1° C., or at least 1.5° C., or at least 2° C., or at least 2.5° C., or at least 3.0° C., or at least 3.5° C., or at least 4.0° C., or at least 4.5° C., or at least 5° C.

In embodiments of the disclosure, the first hydrogen concentration $[H_2]^A$ and the second hydrogen concentration $[H_2]^B$ differ by at least 1 ppm, or at least 5 ppm, or at least 10 ppm, or at least 15 ppm, or at least 20 ppm, or at least 25 ppm, or at least 30 ppm, or at least 35 ppm, or at least 40 ppm, or at least 45 ppm, or at least 50 ppm (where ppm is the mole concentration of $H_2$ in ppm based on the total number of moles of gaseous components in the reactor).

The fluidized bed process described above is well adapted for the preparation of polyethylene and polyethylene copolymers. Hence, monomers and comonomers include ethylene and $C_{3-12}$ alpha olefins which are unsubstituted or substituted by up to two $C_{1-6}$ hydrocarbyl radicals; $C_{8-12}$ vinyl aromatic olefins which are unsubstituted or substituted by up to two substituents selected from $C_{1-4}$ hydrocarbyl radicals; and $C_{4-12}$ straight chained or cyclic diolefins which are unsubstituted or substituted by a $C_{1-4}$ hydrocarbyl radical. Illustrative non-limiting examples of alpha-olefins that may be copolymerized with ethylene include one or more of propylene, 1-butene, 1-pentene, 4-methyl-1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, hydrocarbyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment, the disclosure is directed toward a polymerization process involving the polymerization of one or more of the monomer(s) and comonomer(s) including ethylene alone or in combination with one or more linear or branched comonomer(s) having from 3 to 30 carbon atoms, or for example, 3-12 carbon atoms, or for example, 4 to 8 carbon atoms. The process is particularly well suited to copolymerization reactions involving polymerization of ethylene in combination with one or more of the comonomers, for example, the alpha-olefins: propylene, 1-butene, 1-pentene, 4-methyl-1-pentene, 1-hexene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. In some embodiments the comonomer is an alpha-olefin having from 3 to 15 carbon atoms, or for example, 4 to 12 carbon atoms, or for example, 4 to 10 carbon atoms.

In an embodiment of the present disclosure, ethylene is copolymerized with an alpha olefin having from 3-10 carbon atoms and ethylene makes up at least 75 wt % of the total olefin feed entering the reactor.

In an embodiment of the present disclosure, ethylene is copolymerized with an alpha olefin having from 3-10 carbon atoms and ethylene makes up at least 85 wt % of the total olefin feed entering the reactor.

In embodiments of the present disclosure, ethylene is copolymerized with propylene, 1-butene, 1-hexene or 1-octene.

In an embodiment of the present disclosure, ethylene is copolymerized with 1-butene and ethylene makes up at least 75 weight % (i.e., wt %) of the total olefin feed entering the reactor.

In an embodiment of the present disclosure, ethylene is copolymerized with 1-hexene and ethylene makes up at least 75 wt % of the total olefin feed entering the reactor.

In an embodiment of the present disclosure, ethylene is copolymerized with 1-hexene and ethylene makes up at least 85 wt % of the total olefin feed entering the reactor.

Gas phase fluidized bed polymerization processes may employ a polymer seed bed in the reactor prior to initiating the polymerization process. It is contemplated by the current disclosure to use a polymer seed bed that has been treated with an antistatic agent or an optional scavenger. In addition, the polymer products obtained by using the catalysts and processes of the current disclosure may themselves be used as polymer seed bed materials.

Optionally, scavengers are added to the polymerization process. The present disclosure can be carried out in the presence of any suitable scavenger or scavengers. Scavengers are well known in the art.

In an embodiment of the disclosure, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or hydrocarbyl aluminoxanes having the formula:

wherein each $R^3$ is independently selected from $C_{1-20}$ hydrocarbyl radicals and m is from 3 to 50. Some non-limiting preferred scavengers useful in the current disclosure include triisobutylaluminum, triethylaluminum, trimethylaluminum or other trihydrocarbyl aluminum compounds.

The scavenger may be used in any suitable amount but by way of non-limiting examples only, can be present in an amount to provide a molar ratio of Al:M (where M is the metal of the phosphinimine catalyst) of from about 20 to about 2000, or from about 50 to about 1000, or from about 100 to about 500. In some embodiments the scavenger is added to the reactor prior to the polymerization catalyst and in the absence of additional poisons and over time declines to 0, or is added continuously.

Optionally, the scavengers may be independently supported. For example, an inorganic oxide that has been treated with an organoaluminum compound or hydrocarbyl aluminoxane may be added to the polymerization reactor. The method of addition of the organoaluminum or hydrocarbyl aluminoxane compounds to the support is not specifically defined and is carried out by procedures well known in the art.

The scavenger can be fed to the reactor using any suitable means and may be diluted or dissolved in a suitable liquid hydrocarbon diluent or solvent respectively.

The polymerization process may be carried out in the presence of any suitable anti-static agent or agents. The use of anti-static agents in a gas-phase or a slurry phase polymerization processes is well known in the art. Antistatic agents are also recognized in the art by the term "continuity additive". Generally speaking a "continuity additive" is a substance or a mixture of substances which, when present in appropriate amounts, can reduce, prevent or mitigate at least one of fouling, sheeting, and static level of a material in polymerization reactor.

Some non-limiting examples of continuity additives are alkoxylated amines (also known as alkanolamines, see European Patent No. 811,638 and U.S. Pat. Nos. 6,140,432; 6,124,230; 6,114,479 for examples), carboxylate metal salts (see U.S. Pat. Nos. 7,354,880; 6,300,436; 6,306,984; 6,391, 819; 6,472,342 and 6,608,153 for examples), polysulfones, polymeric polyamines and sulfonic acids (see U.S. Pat. Nos. 6,562,924; 6,022,935 and 5,283,278 for examples). Other possible continuity additives are described in European Pat. Appl. No. 107,127, including polyoxyethylenealkylamines.

Specific examples of alkoxylated amines which may be used in the present disclosure are Kemamine AS-990™, ARMOSTAT 1800™, and ATMER-163™ which are available from Ciba, Akzo-Nobel or Witco Chemical Company. Other suitable continuity additives include aluminum stearate and aluminum oleate. Still other specific continuity additives are supplied commercially under the trademarks OCTASTAT™ and STADIS™. The continuity additive STADIS is described in U.S. Pat. Nos. 7,476,715; 6,562,924 and 5,026,795 and is available from Octel Starreon. STADIS comprises a polysulfone copolymer, a polymeric amine and an oil soluble sulfonic acid. Another suitable continuity additive which is similar to STADIS is commercially available under the tradename STATSAFE™.

In an embodiment of the disclosure, a continuity additive is added directly to the supported catalyst. The amount of continuity additive added to a catalyst will depend on a number of factors such as but not limited to the type of continuity additive and the type of polymerization catalyst (and the type of support). Accordingly the amount of continuity additive used is not specifically defined, but can be from 0 (e.g., optionally) up to 150,000 parts per million (ppm) based on the weight of the supported catalyst. Alternatively, the amount of continuity additive added to a catalyst can be from about 0.2 to 10 weight percent based on the total weight of the catalyst system. By way of non-limiting example only, from 10,000 to 30,000 ppm of a STADIS continuity additive is used when it is combined with a supported polymerization catalyst.

In another embodiment, the antistatic agent may be added directly to the reactor and separately from the polymerization catalyst. The total amount of continuity additive or additives to be present in the reactor will, for example, not exceed 250 or 200, or 150, or 125, or 100, or 90, or 80, or 70 or 60, or 50, or 40, or 30, or 20 or 10 ppm (parts per million by weight of polymer being produced) and/or the amount of continuity additive will be zero, or greater than 1, or 3, or 5, or 7, or 10, or 12, or 14, or 15, or 17, or 20 ppm based on the weight of polymer being produced (usually expressed as pounds or kilograms per unit of time). Any of these lower limits are combinable with any upper limit. These amounts of continuity additive contemplate one, two, three, four or more continuity additives. The total amount of one or two or more continuity additives in the reactor will be understood to be additive and where the total amount can be described as disclosed immediately above. The continuity additive can be added directly to the reactor through a dedicated feed line, and/or added to any convenient feed stream, including the ethylene feed stream, the comonomer feed stream, the catalyst feed line, or the recycle line. If more than one continuity additive is used, each one may be added to the reactor as separate feed streams, or as any combination of separate feed streams or mixtures. The manner in which the continuity additives are added to the reactor is not important, so long as the additive(s) are well dispersed within the fluidized bed, and that their feed rates (or concentrations) are regulated in a manner to provide minimum levels of fouling and/or static. From the productivity of the catalyst it is fairly routine to determine the feed rate of the antistatic agent to the reactor based on the catalyst feed rate.

In another embodiment of the disclosure, the continuity additive (e.g. antistatic agent) may be added directly to the reactor and separately from the polymerization catalyst as well as added directly to the supported catalyst.

An embodiment of the disclosure, is a process for polymerization in a gas phase reactor, the process comprising:

a) fluidizing a bed of polymer particles in a reactor with a gas mixture comprising ethylene and one or more alpha olefin at a first hydrogen concentration $[H_2]^A$;

b) introducing a single site catalyst system to the reactor to initiate a polymerization reaction;

c) polymerizing the ethylene and the one or more alpha olefin at a first reactor temperature, $T^A$ to give a first ethylene copolymer with a first melt index, $I_2^A$, a first melt flow ratio, $(I_{21}/I_2)^A$, and a first density, $d^A$, until at least one reactor bed volume has turned over, where a reactor bed volume is defined as the volume of the reactor from a reactor distributor bed plate to the top of the fluidized bed; and d) subsequently reducing the hydrogen concentration and the reaction temperature to a second hydrogen concentration $[H_2]^B$ and a second reactor temperature $T^B$, respectively, to give a second ethylene copolymer with a second melt index, $I_2^B$, a second melt flow ratio, $(I_{21}/I_2)^B$, and a second density, $d^B$; wherein the first melt index, $I_2^A$ is greater than the second melt index, $I_2^B$.

In an embodiment of the disclosure, a second ethylene copolymer has a second melt flow ratio, $(I_{21}/I_2)^B$ which greater than a first melt flow ratio, $(I_{21}/I_2)^A$ or a first ethylene copolymer.

In an embodiment of the disclosure, first and second ethylene copolymers each have a melt flow ratio, $(I_{21}/I_2)$ of from 20 to 50.

In an embodiment of the disclosure, a first melt flow ratio, $(I_{21}/I_2)^A$ of a first ethylene copolymer is at least 25.

In an embodiment of the disclosure, a second melt flow ratio, $(I_{21}/I_2)^B$ of a second ethylene copolymer is at least 30.

In an embodiment of the disclosure, a first melt flow ratio, $(I_{21}/I_2)^A$ of a first ethylene copolymer is less than 33.0.

In an embodiment of the disclosure, a second ethylene copolymer has a second melt flow ratio, $(I_{21}/I_2)^B$ of ≥33.0.

In an embodiment of the disclosure, a first melt index, $I_2^A$ of a first ethylene copolymer is greater than 1 g/10 min.

In an embodiment of the disclosure, a second melt index, $I_2^B$ of a second ethylene copolymer is less than 1 g/10 min.

In an embodiment of the disclosure, a first density, $d^A$ of a first ethylene copolymer is greater than a second density, $d^B$ of a second ethylene copolymer.

In an embodiment of the disclosure, first and second ethylene copolymers each have a density of from 0.912 to 0.937 g/cm³.

In an embodiment of the disclosure, a second ethylene copolymer has a molecular weight distribution $(M_w/M_n)$ which is greater than the molecular weight distribution $(M_w/M_n)$ of a first ethylene copolymer.

In an embodiment of the disclosure, first and second ethylene copolymers each have a molecular weight distribution $(M_w/M_n)$ of from 3.5 to 6.0.

In an embodiment of the disclosure, a first reactor temperature, $T^A$ and a second reactor temperature, $T^B$ differ by at least 2° C.

In an embodiment of the disclosure, a first hydrogen concentration $[H_2]^A$ and a second hydrogen concentration $[H_2]^B$ differ by at least 15 ppm.

In an embodiment of the disclosure, a single site catalyst system comprises a phosphinimine catalyst.

In an embodiment of the disclosure, a single site catalyst system comprises a phosphinimine catalyst having the formula: (L)(PI)MX₂, where M is Ti, Zr or Hf; PI is a phosphinimine ligand having the formula R₃P=N—, where R is independently selected from hydrogen, halogen, and $C_1$-$C_{20}$ hydrocarbyl; L is a ligand selected from indenyl, or substituted indenyl; and X is an activatable ligand.

In an embodiment of the disclosure, a single site catalyst system comprises a phosphinimine catalyst having the formula:

(1-R²-Indenyl)Ti(N=P(t-Bu)₃)X₂;

wherein R² is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; and wherein X is an activatable ligand.

EXAMPLES

All reactions involving air and or moisture sensitive compounds were conducted under nitrogen using standard Schlenk and cannula techniques, or in a glovebox. Reaction solvents were purified either using the system described by Pangborn et. al. in *Organometallics* 1996, v 15, p. 1518 or used directly after being stored over activated 4 Å molecular sieves. The methylaluminoxane used was a 10% MAO solution in toluene supplied by Albemarle which was used as received. The support used was silica Sylopol 2408 obtained from W.R. Grace. & Co. The support was calcined by fluidizing with air at 200° C. for 2 hours followed by nitrogen at 600° C. for 6 hours and stored under nitrogen.

Melt index, $I_2$, in g/10 min was determined on a Tinius Olsen Plastomer (Model MP993) in accordance with ASTM D1238 Procedure A (Manual Operation) at 190° C. with a 2.16 kilogram weight. High load melt index, $I_{21}$, in g/10 min was determined in accordance with ASTM D1238 Procedure A at 190° C. with a 21.6 kilogram weight. Melt flow ratio (also sometimes called melt index ratio) is $I_{21}/I_2$.

Polymer density was determined in grams per cubic centimeter (g/cc) according to ASTM D792.

Molecular weight information ($M_w$, $M_n$ and $M_z$ in g/mol) and molecular weight distribution ($M_w/M_n$), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("$M_n$") and 5.0% for the weight average molecular weight ("$M_w$"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e., the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration.

Hexane extractables using compression molded plaques were determined according to ASTM D5227.

To determine the composition distribution breadth index $CDBI_{50}$ (which is also designated CDBI(50) in the present disclosure so that $CDBI_{50}$ and CDBI(50) are used interchangeably), a solubility distribution curve is first generated for the copolymer. This is accomplished using data acquired from the TREF technique (see below). This solubility distribution curve is a plot of the weight fraction of the copolymer that is solubilized as a function of temperature. This is converted to a cumulative distribution curve of weight fraction versus comonomer content, from which the $CDBI_{50}$ is determined by establishing the weight percentage of a copolymer sample that has a comonomer content within 50% of the median comonomer content on each side of the median (see WO 93/03093 for the definition of $CDBI_{50}$). The weight percentage of copolymer eluting at from 90-105° C., is determined by calculating the area under the TREF curve at an elution temperature of from 90 to 105° C. The weight percent of copolymer eluting below at or 40° C. and above 100° C. was determined similarly. For the purpose of simplifying the correlation of composition with elution temperature, all fractions are assumed to have a $M_n \geq 15,000$, where $M_n$ is the number average molecular weight of the fraction. Any low weight fractions present generally represent a trivial portion of the polymer. The remainder of this description and the appended claims maintain this convention of assuming all fractions have $M_n \geq 15,000$ in the $CDBI_{50}$ measurement.

The specific temperature rising elution fractionation (TREF) method used herein was as follows. Homogeneous polymer samples (pelletized, 50 to 150 mg) were introduced into the reactor vessel of a crystallization-TREF unit (Polymer ChAR™). The reactor vessel was filled with 20 to 40 mL 1,2,4-trichlorobenzene (TCB), and heated to the desired dissolution temperature (e.g. 150° C.) for 1 to 3 hours. The solution (0.5 to 1.5 mL) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

The TREF procedures described above are well known to persons skilled in the art and can be used to determine the modality of a TREF profile, a $CDBI_{50}$, a copolymer wt % eluting at or below 40° C., a copolymer wt % eluting at above 100° C., a copolymer wt % eluting at from 90° C. to 105° C., a T(75)-T(25) value, as well as the temperatures or temperature ranges where elution intensity maxima (elution peaks) occur.

Dynamic Mechanical Analysis (DMA). Rheological measurements (e.g., small-strain (10%) oscillatory shear measurements) were carried out on a dynamic Rheometrics SR5 Stress rotational rheometer with 25 mm diameter parallel plates in a frequency sweep mode under full nitrogen blanketing. The polymer samples are appropriately stabilized with the anti-oxidant additives and then inserted into the test fixture for at least one minute preheating to ensure the normal force decreasing back to zero. All DMA experiments are conducted at 10% strain, 0.05 to 100 rad/s and 190° C. Orchestrator Software is used to determine the viscoelastic parameters including the storage modulus (G'), loss modulus (G"), phase angle (δ), complex modulus (G*) and complex viscosity (η*).

The complex viscosity $|\eta(\omega)|$ versus frequency (ω) data were then curve fitted using the modified three parameter Carreau-Yasuda (CY) empirical model to obtain the zero shear viscosity ηo, characteristic viscous relaxation time $\tau_\eta$, and the breadth of rheology parameter-a. The simplified Carreau-Yasuda (CY) empirical model used is as follows:

$$|\eta^*(\omega)| = \eta_0/[1+(\tau_\eta \omega)^a]^{(1-n)/a}$$

wherein: $|\eta^*(\omega)|$=magnitude of complex shear viscosity; $\eta_0$=zero shear viscosity; $\tau_n$=characteristic relaxation time; a="breadth" of rheology parameter (which is also called the "Carreau-Yasuda shear exponent" or the "CY a-parameter" or simply the "a-parameter" in the current disclosure); n=fixes the final power law slope, fixed at 2/11; and ω=angular frequency of oscillatory shearing deformation. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987); each of which is incorporated herein by reference in its entirety.

The Shear Thinning Index (SHI) was determined according to the method provided in U.S. Pat. Appl. No. 2011/0212315: the SHI is defined as $SHI(\omega)=\eta^*(\omega)/\eta 0$ for any given frequency (ω) for dynamic viscosity measurement, wherein η0 is zero shear viscosity @190° C. determined via the empiric Cox-Merz-rule. η* is the complex viscosity @190° C. determinable upon dynamic (sinusoidal) shearing or deformation of a copolymer as determined on a Rheometrics SR5 Stress rotational rheometer using parallel-plate geometry. According to the Cox-Merz-Rule, when the frequency (ω) is expressed in Radiant units, at low shear rates, the numerical value of η* is equal to that of conventional, intrinsic viscosity based on low shear capillary measurements. The skilled person in the field of rheology is well versed with determining η0 in this way.

A compression molded film of 0.0035 inches was extracted at 50° C. in hexane for 2 hours. The sample was re-weighed and the extractable content was determined from the relative change in sample weight according to ASTM D5227.

The melting points including a peak melting point ($T_m$) and the percent crystallinity of the copolymers are determined by using a $T^A$ Instrument DSC Q1000 Thermal Analyzer at 10° C./min. In a DSC measurement, a heatingcooling-heating cycle from room temperature to 200° C. or vice versa is applied to the polymers to minimize the thermo-mechanical history associated with them. The melting point and percent of crystallinity are determined by the primary peak temperature and the total area under the DSC curve respectively from the second heating data. The peak melting temperature $T_m$ is the higher temperature peak, when two peaks are present in a bimodal DSC profile (typically also having the greatest peak height).

Single Site Catalyst System

Synthesis of Supported (1-$C_6F_5CH_2$-Indenyl)((t-Bu)$_3$P=N)TiCl$_2$.

To distilled indene (15.0 g, 129 mmol) in heptane (200 mL) was added BuLi (82 mL, 131 mmol, 1.6 M in hexanes) at room temperature. The resulting reaction mixture was stirred overnight. The mixture was filtered and the filter cake washed with heptane (3×30 mL) to give indenyllithium (15.62 g, 99% yield). Indenyllithium (6.387 g, 52.4 mmol) was added as a solid over 5 minutes to a stirred solution of $C_6F_5CH_2$—Br (13.65 g, 52.3 mmol) in toluene (100 mL) at room temperature. The reaction mixture was heated to 50° C. and stirred for 4 h. The product mixture was filtered and washed with toluene (3×20 mL). The combined filtrates were evaporated to dryness to afford 1-$C_6F_5CH_2$-indene (13.58 g, 88%). To a stirred slurry of TiCl$_4$.2THF (1.72 g, 5.15 mmol) in toluene (15 mL) was added solid (t-Bu)$_3$P=N—Li (1.12 g, 5 mmol) at room temperature. The resulting reaction mixture was heated at 100° C. for 30 min and then allowed to cool to room temperature. This mixture containing ((t-Bu)$_3$P=N)TiCl$_3$ (1.85 g, 5 mmol) was used in the next reaction. To a THF solution (10 mL) of 1-$C_6F_5CH_2$-indene (1.48 g, 5 mmol) cooled at −78° C. was added n-butyllithium (3.28 mL, 5 mmol, 1.6 M in hexanes) over 10 minutes. The resulting dark orange solution was stirred for 20 minutes and then transferred via a double-ended needle to a toluene slurry of ((t-Bu)$_3$P=N)TiCl$_3$ (1.85 g, 5 mmol). The cooling was removed from the reaction mixture which was stirred for a further 30 minutes. The solvents were evaporated to afford a yellow pasty residue. The solid was re-dissolved in toluene (70 mL) at 80° C. and filtered hot. The toluene was evaporated to afford pure (1-$C_6F_5CH_2$-Indenyl)((t-Bu)$_3$P=N)TiCl$_2$ (2.35 g, 74%).

Sylopol 2408 silica purchased from Grace Davison was calcined by fluidizing with air at 200° C. for 2 hours and subsequently with nitrogen at 600° C. for 6 hours. 114.273 grams of the calcined silica was added to 620 mL of toluene. 312.993 g of a MAO solution containing 4.5 weight % Al purchased from Albemarle was added to the silica slurry quantitatively. The mixture was stirred for 2 hours at ambient temperature. The stirring rate should be such so as not to break-up the silica particles. 2.742 grams of (1-$C_6F_5CH_2$-Indenyl)((t-Bu)$_3$P=N)TiCl$_2$ (prepared as above) was weighed into a 500-mL Pyrex bottle and 300 mL of toluene added. The metal complex solution was added to the silica slurry quantitatively. The resulting slurry was stirred for 2 hours at ambient temperature. Next, 21.958 g of 18.55 wt % toluene solution of pre-dried Armostat® 1800 was weighed into a small vessel and transferred quantitatively to the silica slurry. The resulting mixture was stirred for a further 30 minutes after which the slurry was filtered, yielding a clear filtrate. The solid component was washed with toluene (2×150 mL) and then with pentane (2×150 mL). The final product was dried in vacuo to between 450 and 200 mtorr and stored under nitrogen until used. The finished catalyst had a pale yellow to pale orange colour. The catalyst had 2.7 wt % of Armostat-1800 present.

General Polymerization Conditions

Ethylene/1-hexene copolymerization experiments were conducted in a continuous fluidized bed gas phase Pilot Plant scale reactor. An example of a reactor configuration and typical process operational parameters is given in for example U.S. Pat. No. 8,338,551 B2 and in Eur. Pat. Appl. No. 1,308,464 A1 (see Examples 10 and 11). Ethylene polymerizations were generally run at from 80° C.-85° C. with a total operating pressure of 300 pounds per square inch gauge (psig). Gas phase compositions for ethylene and 1-hexene were controlled via closed-loop process control to values of 35-50.0 and 0.5-2.0 mole %, respectively. Hydrogen was metered into the reactor in a molar feed ratio of 0.0008-0.0015 relative to ethylene feed during polymerization. Nitrogen constituted the remainder of the gas phase mixture (approximately 34-49 mole %). A typical production rate for these conditions is 100 to 250 kg of polyethylene per hour. A seed-bed was used and prior to polymerization start-up was washed with a small amount of triethylaluminum, TEAL to scavenge impurities. The required gas composition of ethylene, 1-hexene, hydrogen, nitrogen and pentane/isopentane in the reactor is built to target amounts before injection of catalyst. The level of pentane/isopentane can range from 9-17 mole % in the reactor. The reactor was started with the catalyst feed line alone without additional scavenging with TEAL during the polymerization start-up.

Pelletization of Granular Resins 500 ppm of Irganox 1076 and 1000 ppm of Irgafos 168 were dry blended with the granular resin prior to pelletization. The resulting powder blend was extruded on Leistritz twin-screw extruder with a screw diameter of 38 mm and L/D ratio of 33/1 under nitrogen atmosphere to minimize polymer degradation. The pelletization conditions of the extruder were set at a melt temperature of 210° C. an output rate of 20 to 25 lb/hr, a screw speed of 120 rpm and a pelletizer speed of 30 to 40 rpm. The pelleted resin was cooled and then collected for the resin characterization and film evaluation.

Polymerization Reaction Start-Up and Transition

Example 1. Baseline Reactor Temperature and Hydrogen Concentration

The reactor compositions were built up in the presence of a reactor seed bed and fluidizing gases under dry mode operation prior to the injection of the polymerization catalyst. After catalyst injection, the initial production rate is increased and the process is moved into condensing mode operation. In this example, the polymerization reaction was started up while maintaining a reaction temperature of 80° C. and a hydrogen concentration of from 291 to 316 ppm (the mole concentration of $H_2$ in ppm based on the total number of moles of gaseous components in the reactor). As shown in Table 1, under these conditions the polymer produced had an $I_2$ of from 0.69 to 0.72 g/10 min, an $I_{21}/I_2$ of from 42.8 to 44.6, and a density of from 0.9250 to 0.9264 g/cm$^3$. About 13 hours after the injection of catalyst the polymerization run was aborted due the formation of sheets within the fluidized bed reactor.

Example 2. Higher Reactor Temperature

The reactor compositions were built up in the presence of a reactor seed bed and fluidizing gases under dry mode operation prior to the injection of the polymerization catalyst. After catalyst injection, the initial production rate is increased and the process is moved into condensing mode operation. In this example, the polymerization reaction was started up while maintaining a reaction temperature of 85° C. and a hydrogen concentration of from 308 to 350 ppm (the mole concentration of $H_2$ in ppm based on the total number of moles of gaseous components in the reactor). As shown in Table 2, under these conditions the polymer produced had an $I_2$ of from 1.02 to 1.16 g/10 min, an $I_{21}/I_2$ of from 27.5 to 29.6, and a density of from 0.9215 to 0.9222 g/cm$^3$. On this occasion the reactor ran smoothly for more than 15 hours without sheet formation.

A person skilled in the art will recognize from a comparison between Examples 1 and 2, that an increase in the polymerization reactor temperature which caused a corresponding increase in the polymer $I_2$ and decrease in the polymer MFR ($I_{21}/I_2$) during the preliminary stages of reactor operation was beneficial. During the first 15 hours of polymerization, reactor fouling in Example 2 was markedly reduced, relative to Example 1.

Example 3. Transition from Higher to Lower Reactor Temperature

The reactor compositions were built up in the presence of a reactor seed bed and fluidizing gases under dry mode operation prior to the injection of the polymerization catalyst. After catalyst injection, the initial production rate is increased and the process is moved into condensing mode operation. In this example, the polymerization reaction was started up while maintaining a reaction temperature of 85° C. and a hydrogen concentration of from 279 to 299 ppm (the mole concentration of $H_2$ in ppm based on the total number of moles of gaseous components in the reactor). As shown in Table 3, under these initial conditions the polymer produced had an $I_2$ of from 0.74 to 0.9 g/10 min, an $I_{21}/I_2$ of from 29.8 to 30.9, and a density of from 0.9222 to 0.9225 g/cm$^3$. After smooth polymerization was established under these conditions and at least one reactor bed volume had been turned over, the reactor temperature was reduced to 82.5° C. in an attempt to make a resin having a lower melt index and a higher melt flow ratio. The reactor bed volume (which may for example contain seedbed particles and/or newly formed polymer particles) discussed here is the volume of the reactor occupied by the fluidized particles between the reactor bed distributor plate and the top of the fluidized bed of polymer particles (also known as the bed height). As can be seen in Table 3, after the temperature was reduced, the polymer produced had an $I_2$ of from 0.46 to 0.65 g/10 min, an $I_{21}/I_2$ of from 34.0 to 35.8, and a density of from 0.9205 to about 0.9216 g/cm$^3$. After moving from the higher temperature of 85° C. to the lower temperature of 82.5° C., the polymerization run remained stable with no evidence of reactor fouling. This example shows that the strategy of starting up a reactor at higher temperature to make a product with a higher melt index (12) and lower melt flow ratio ($I_{21}/I_2$), followed by moving to a lower temperature to make a product with a lower melt index and a higher melt flow ratio was an improvement over trying to start up the reactor initially targeting a product with a lower melt index and a higher melt flow ratio (see for comparison, Example 1).

Example 4. Transition from Higher Reactor Temperature and Hydrogen Concentration to Lower Reactor Temperature and Hydrogen Concentration The reactor compositions were built up in the presence of a reactor seed bed and fluidizing gases under dry mode operation prior to the injection of the polymerization catalyst. After catalyst injection, the initial production rate is increased and the process is moved into condensing mode operation. In this example, the polymerization reaction was started up while maintaining a reaction temperature of 85° C. and a hydrogen concentration of from 352 to 413 ppm. As shown in Table 4, under the initial condensed mode operating conditions the polymer produced had an $I_2$ of from 1.86 to 5.0 g/10 min, an $I_{21}/I_2$ of from 30.0 to 33.8, and a density of from 0.9223 to 0.9294 g/cm$^3$. After smooth polymerization was established under these conditions, the reactor temperature and hydrogen concentration were reduced in an attempt to make a resin having a lower melt index ($I_2$) and a higher melt flow ratio ($I_{21}/I_2$) without reactor upset. As can be seen in Table 4, after the temperature was reduced from 85° C. to 82.5° C., the polymer produced had an $I_2$ of from 1.34 to 1.68 g/10 min, an $I_{21}/I_2$ of from 33.0 to 32.6, and a density of from 0.9225 to 0.9237 g/cm$^3$. The polymerization run remained stable with no evidence of reactor fouling. Next, the reactor hydrogen level was also reduced. Table 4 shows that during this period when the hydrogen concentration was from 316 to 319 ppm, the polymer produced had an $I_2$ of from 0.90 to 1.1 g/10 min, an $I_{21}/I_2$ of from 37.2 to 38.7, and a density of from 0.9217 to 0.922.2 g/cm$^3$. The reactor continued to operate smoothly after the hydrogen concentration was reduced. Finally, the reactor temperature was again reduced, this time to 80° C. The reactor operability remained stable. As shown in Table 4, the product produced under these conditions had an $I_2$ of about 0.55 g/10 min, an $I_{21}/I_2$ of about 40.5, and a density of about 0.9208 g/cm$^3$. The final values achieved for the product produced were the desired set of values for "on-spec" polymer. In addition, the data in Table 4 show that when the temperature and hydrogen concentration are decreased, the molecular weight distribution ($M_w/M_n$) of the copolymer increased from below about 5.0 to above about 5.5.

A person skilled in the art will recognize from Example 4, that the present disclosure provides a method for starting up a reactor under conditions of higher temperature and higher hydrogen concentration so as to establish stable operation while making a polymer having a relatively high $I_2$ value and a relatively low $I_{21}/I_2$ value. Once stable operation is achieved, a product having the desired melt index and melt flow values, which are lower and higher respectively, can be obtained without reactor upset or fouling by moving to conditions of lower reaction temperature and lower hydrogen concentration.

TABLE 1

| Polymerization Reaction Times | | $I_2$ (g/10 min) | $I_{21}$ (g/10 min) | MFR $I_{21}/I_2$ | Density (g/cm$^3$) |
|---|---|---|---|---|---|
| 6:00 | 9:00 | 0.72 | 30.8 | 42.8 | 0.9250 |
| 9:00 | 12:00 | 0.69 | 30.8 | 44.6 | 0.9264 |
| 16:00 | 19:00 | 0.69 | 30.8 | 44.6 | 0.9264 |

| Conditions, Target Temp. (deg.) | C2% | H2 (ppm) | C6% | Actual Temp (deg.) | $M_w/M_n$ |
|---|---|---|---|---|---|
| CMO, 80 | 37 | 316 | 0.5579 | 80.1 | 5.78 |
| CMO, 80 | 37 | 291 | 0.5654 | 80.0 | |
| CMO, 80 | 42 | 314 | 0.6258 | 80.1 | |

Note:
C2 = ethylene,
H2 = hydrogen,
C6 = 1-hexene,
CMO = condensed mode operation

TABLE 2

| Polymerization Reaction Times | | $I_2$ (g/10 min) | $I_{21}$ (g/10 min) | MFR $I_{21}/I_2$ | Density (g/cm³) |
|---|---|---|---|---|---|
| 3:00 | 6:00 | 1.12 | 31.2 | 27.9 | 921.5 |
| 7:00 | 10:00 | 1.14 | 31.3 | 27.5 | 922.0 |
| 10:00 | 13:00 | 1.02 | 30.2 | 29.6 | 922.2 |
| 13:00 | 15:00 | 1.16 | 32.6 | 28.1 | 922.0 |
| 15:00 | 18:00 | 1.07 | 29.7 | 27.8 | 921.8 |

| Conditions, Target Temp. (deg.) | C2% | H2 (ppm) | C6% | Actual Temp (deg.) | $M_w/M_n$ |
|---|---|---|---|---|---|
| CMO, 85 C. | 44 | 350 | 0.8575 | 85.0 | |
| CMO, 85 C. | 42 | 311 | 0.7632 | 84.9 | |
| CMO, 85 C. | 42 | 308 | 0.7667 | 85.0 | 3.94 |
| CMO, 85 C. | 42 | 316 | 0.8152 | 84.9 | 3.62 |
| CMO, 85 C. | 42 | 317 | 0.7889 | 85.1 | |

Note:
C2 = ethylene,
H2 = hydrogen,
C6 = 1-hexene,
CMO = condensed mode operation

TABLE 3

| Polymerization Reaction Times | | $I_2$ (g/10 min) | $I_{21}$ (g/10 min) | MFR $I_{21}/I_2$ | Density (g/cm³) |
|---|---|---|---|---|---|
| Day 1 | | | | | |
| 3:00 | 6:00 | 0.9 | 26.8 | 29.8 | 922.5 |
| 6:00 | 9:00 | 0.74 | 22.9 | 30.9 | 922.2 |
| 9:00 | 12:00 | 0.71 | 22.6 | 31.8 | 922.6 |
| 12:00 | 15:00 | 0.46 | 16.0 | 34.8 | 921.0 |
| 15:00 | 18:00 | 0.55 | 18.7 | 34.0 | 921.6 |
| 18:00 | 21:00 | 0.48 | 16.9 | 35.2 | 920.5 |
| 21:00 | 0:00 | 0.55 | 19.2 | 34.9 | 921.2 |
| Day 2 | | | | | |
| 0:00 | 3:00 | 0.48 | 17.2 | 35.8 | 920.6 |
| 3:00 | 6:00 | 0.65 | 22.1 | 34.0 | 920.8 |

| Conditions, Target Temp. (deg.) | C2% | H2 (ppm) | C6% | Actual Temp (deg.) | $M_w/M_n$ |
|---|---|---|---|---|---|
| CMO | 38 | 279 | 0.6607 | 85.1 | 4.29 (partly seedbed) |
| CMO | 40 | 299 | 0.7018 | 85.1 | |
| CMO, 85 to 82.5 | 39 | 292 | 0.6736 | 84.3 | 3.53 |
| CMO, 82.5 | 37 | 271 | 0.6397 | 82.9 | |
| CMO, 82.5 | 36 | 264 | 0.6138 | 82.5 | |
| CMO, 82.5 | 37 | 268 | 0.6531 | 82.5 | 4.51 |
| CMO, 82.5 | 38 | 284 | 0.6633 | 82.5 | |
| CMO, 82.5 | 37 | 278 | 0.6508 | 82.5 | 4.37 |
| CMO, 82.5 | 37 | 282 | 0.6457 | 82.5 | 4.32 |

Note:
C2 = ethylene,
H2 = hydrogen,
C6 = 1-hexene,
CMO = condensed mode operation

TABLE 4

| Polymerization Reaction Times | | $I_2$ (g/10 min) | $I_{21}$ (g/10 min) | MFR $I_{21}/I_2$ | Density (g/cm³) |
|---|---|---|---|---|---|
| Day 1 | | | | | |
| 15:31 | | No product taken for testing | | | |
| Day 2 | | | | | |
| 4:13 | 13:35 | 5.00 | 150.0 | 30.00 | 929.4 |
| 14:14 | 17:18 | 4.30 | | | 927.7 |
| Day 3 | | | | | |
| 0:40 | 3:58 | 1.50 | 50.7 | 33.80 | 922.3 |
| 7:00 | | 1.90 | 64.0 | 33.68 | 923.4 |
| 7:47 | | 1.86 | 61.0 | 32.80 | 922.7 |
| 7:48 | 13:19 | 1.68 | 55.5 | 33.04 | 922.5 |
| 14:20 | 20:15 | 1.34 | 43.7 | 32.61 | 923.7 |
| Day 4 | | | | | |
| 7:00 | | 1.08 | 43.0 | 39.81 | 921.8 |
| 9:00 | | 1.11 | 43.0 | 38.74 | 921.7 |
| 7:36 | 9:47 | 0.90 | 33.5 | 37.22 | 922.2 |
| 9:48 | 11:48 | 0.68 | 26.6 | 39.12 | 921.8 |
| 11:48 | 13:48 | 0.55 | 22.3 | 40.55 | 920.8 |

| Conditions, Target Temp. (deg. C.) | C2% | H2 (ppm) | C6% | Actual Temp (deg. C.) | $M_w/M_n$ |
|---|---|---|---|---|---|
| Start-up in DMO, 85 | 37 | 377 | 0.5217 | 84.8 | |
| DMO to CMO, 85 | 43 | 413 | 0.7141 | 85.2 | |
| CMO, 85 | 42 | 372 | 0.7140 | 85.0 | |
| CMO, 85 | 42 | 359 | 0.7533 | 85.0 | 4.68 |
| CMO, 85 | 41 | 352 | 0.7400 | 85.2 | |
| CMO, 85 | 41 | 356 | 0.7381 | 85.1 | 4.21 |
| CMO, 82.5 | 42 | 357 | 0.7474 | 84.2 | |
| CMO, 82.5 | 43 | 339 | 0.7596 | 82.5 | |
| CMO, 82.5 | 42 | 319 | 0.7400 | 82.6 | |
| CMO, 82.5 | 42 | 316 | 0.7400 | 82.6 | |
| CMO, 82.5 | 42 | 316 | 0.7464 | 82.6 | 5.15 |
| CMO, 82.5 to ~80 C. | 45 | 321 | 0.7807 | 80.8 | 5.19 |
| CMO, 80 | 46 | 323 | 0.8049 | 79.9 | 5.94 |

Note:
C2 = ethylene,
H2 = hydrogen,
C6 = 1-hexene,
CMO = condensed mode operation,
DMO = dry mode operation

What is claimed is:

1. A process for polymerization in a gas phase reactor, the process comprising:
   a) fluidizing a bed of polymer particles in a reactor with a gas mixture comprising ethylene and one or more alpha olefin at a first hydrogen concentration $[H_2]^A$;
   b) introducing a single site catalyst system to the reactor to initiate a polymerization reaction;
   c) polymerizing the ethylene and the one or more alpha olefin at a first reactor temperature, $T^A$ to give a first ethylene copolymer with a first melt index, $I_2^A$, a first melt flow ratio, $(I_{21}/I_2)^A$, and a first density, $d^A$, until at least one reactor bed volume has turned over, where a reactor bed volume is defined as the volume of the reactor from a reactor distributor bed plate to the top of the fluidized bed; and
   d) subsequently reducing the hydrogen concentration and the reaction temperature to a second hydrogen concentration $[H_2]^B$ and a second reactor temperature $T^B$, respectively, to give a second ethylene copolymer with a second melt index, $I_2^B$, a second melt flow ratio, $(I_{21}/I_2)^B$, and a second density, $d^B$; wherein the first melt index, $I_2^A$ is greater than the second melt index, $I_2^B$.

2. The process of claim 1 wherein the second melt flow ratio, $(I_{21}/I_2)^B$ is greater than the first melt flow ratio, $(I_{21}/I_2)^A$.

3. The process of claim 1 wherein the first and second ethylene copolymers each have a melt flow ratio, $(I_{21}/I_2)$ of from 20 to 50.

4. The process of claim 2 wherein the first and second ethylene copolymers each have a melt flow ratio, $(I_{21}/I_2)$ of from 20 to 50.

5. The process of claim 1 wherein the first melt flow ratio, $(I_{21}/I_2)^A$ is at least 25.

6. The process of claim 1 wherein the second melt flow ratio, $(I_{21}/I_2)^B$ is at least 30.

7. The process of claim 5 wherein the second melt flow ratio, $(I_{21}/I_2)^B$ is at least 30.

8. The process of claim 1 wherein the first melt flow ratio, $(I_{21}/I_2)^A$ is less than 33.0.

9. The process of claim 1 wherein the second ethylene copolymer has a second melt flow ratio, $(I_{21}/I_2)^B$ of at least 33.0.

10. The process of claim 8 wherein the second ethylene copolymer has a second melt flow ratio, $(I_{21}/I_2)^B$ of at least 33.0.

11. The process of claim 1 wherein the first melt index, $I_2^A$ is greater than 1 g/10 min.

12. The process of claim 1 wherein the second melt index, $I_2^B$ is less than 1 g/10 min.

13. The process of claim 11 wherein the second melt index, $I_2^B$ is less than 1 g/10 min.

14. The process of claim 1 wherein the first density, $d^A$ is greater than the second density, $d^B$.

15. The process of claim 1 wherein the first and second ethylene copolymers each have a density of from 0.912 to 0.937 g/cm$^3$.

16. The process of claim 14 wherein the first and second ethylene copolymers each have a density of from 0.912 to 0.937 g/cm$^3$.

17. The process of claim 1 wherein the second ethylene copolymer has a molecular weight distribution $(M_w/M_n)$ which is greater than the molecular weight distribution $(M_w/M_n)$ of first ethylene copolymer.

18. The process of claim 1 wherein the first and second ethylene copolymers each have a molecular weight distribution $(M_w/M_n)$ of from 3.5 to 6.0.

19. The process of claim 17 wherein the first and second ethylene copolymers each have a molecular weight distribution $(M_w/M_n)$ of from 3.5 to 6.0.

20. The process of claim 1 wherein the first reactor temperature, $T^A$ and the second reactor temperature, $T^B$ differ by at least 2° C.

21. The process of claim 1 wherein the first hydrogen concentration $[H_2]^A$ and the second hydrogen concentration $[H_2]^B$ differ by at least 15 ppm.

22. The process of claim 20 wherein the first hydrogen concentration $[H_2]^A$ and the second hydrogen concentration $[H_2]^B$ differ by at least 15 ppm.

23. The process of claim 1 wherein the single site catalyst system comprises a phosphinimine catalyst.

24. The process of claim 1 wherein single site catalyst system comprises a phosphinimine catalyst having the formula: $(L)(PI)MX_2$, where M is Ti, Zr or Hf; PI is a phosphinimine ligand having the formula $R_3P=N-$, where R is independently selected from hydrogen, halogen, and $C_1$-$C_{20}$ hydrocarbyl; L is a ligand selected from indenyl, or substituted indenyl; and X is an activatable ligand.

25. The process of claim 1 wherein the single site catalyst system comprises a phosphinimine catalyst having the formula:

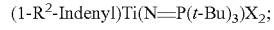

wherein $R^2$ is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; and wherein X is an activatable ligand.

* * * * *